(12) United States Patent
Phan et al.

(10) Patent No.: US 6,771,774 B1
(45) Date of Patent: Aug. 3, 2004

(54) FILTER ARRANGEMENT FOR SHAPING A PULSE PROPAGATED OVER POTS WIRING, AND A METHOD OF MANUFACTURING THE SAME

(75) Inventors: Chinh Phan, Fremont, CA (US); Gihad Ghaibeh, Redwood City, CA (US)

(73) Assignee: Tut Systems, Inc., Lake Oswego, OR (US)

( * ) Notice: Subject to any disclaimer, the term of this patent is extended or adjusted under 35 U.S.C. 154(b) by 0 days.

(21) Appl. No.: 09/454,251

(22) Filed: Dec. 2, 1999

(51) Int. Cl.[7] .............................................. H04M 1/00
(52) U.S. Cl. ............................. 379/413.02; 379/399.01
(58) Field of Search ........................... 379/399.01, 398, 379/413.02, 413.03, 402, 403, 404, 413.04, 418, 341, 237, 235, 257, 93.09, 93.14

(56) References Cited

U.S. PATENT DOCUMENTS

| | | | |
|---|---|---|---|
| 4,706,246 A | 11/1987 | Kume | |
| 4,785,396 A | 11/1988 | Murphy et al. | |
| 4,817,115 A | 3/1989 | Campo et al. | |
| 4,849,721 A | 7/1989 | Matsuura | |
| 5,025,443 A | * 6/1991 | Gupta | ........................ 370/221 |
| 5,151,698 A | 9/1992 | Pophillat | |
| 5,162,791 A | 11/1992 | Heegard | |
| 5,224,029 A | 6/1993 | Newman, Jr. | |
| 5,256,997 A | 10/1993 | Inagaki | |
| 5,339,307 A | 8/1994 | Curtis | |
| 5,450,594 A | 9/1995 | Aden et al. | |
| 5,515,035 A | 5/1996 | Gut | |
| 5,548,614 A | 8/1996 | Stoll et al. | |
| 5,587,692 A | 12/1996 | Graham et al. | |
| 5,614,901 A | 3/1997 | Haas | |
| 5,657,326 A | 8/1997 | Burns | |
| 5,696,790 A | 12/1997 | Graham et al. | |
| 5,745,001 A | * 4/1998 | Ueshima et al. | ............. 327/553 |
| 5,745,838 A | 4/1998 | Tresness et al. | |
| 5,774,027 A | 6/1998 | Yamamoto | |
| 5,963,539 A | 10/1999 | Webber | |
| 5,963,595 A | * 10/1999 | Graham et al. | .............. 375/238 |
| 5,982,741 A | 11/1999 | Ethier | |
| 6,075,795 A | 6/2000 | Barsoum | |
| 6,157,616 A | 12/2000 | Whitehead | |
| 6,381,213 B1 | 4/2002 | Webber | |
| 6,535,581 B2 | * 3/2003 | Singaliese | ................. 379/29.01 |

* cited by examiner

Primary Examiner—Rexford Barnie
(74) Attorney, Agent, or Firm—Blakely, Sokoloff Taylor & Zafman LLP

(57) ABSTRACT

A filter arrangement, for shaping a signal transmitted over POTS wiring, includes an input to receive a signal. The filter arrangement includes a signal path from the input to an output that is coupled to POTS wiring. The transmit path includes a high-pass filter, a low-pass filter, and a trap filter coupled between the high and the low-pass filter. The trap filter operationally introduces a filter zero at a resonant frequency of the high-pass filter.

22 Claims, 34 Drawing Sheets

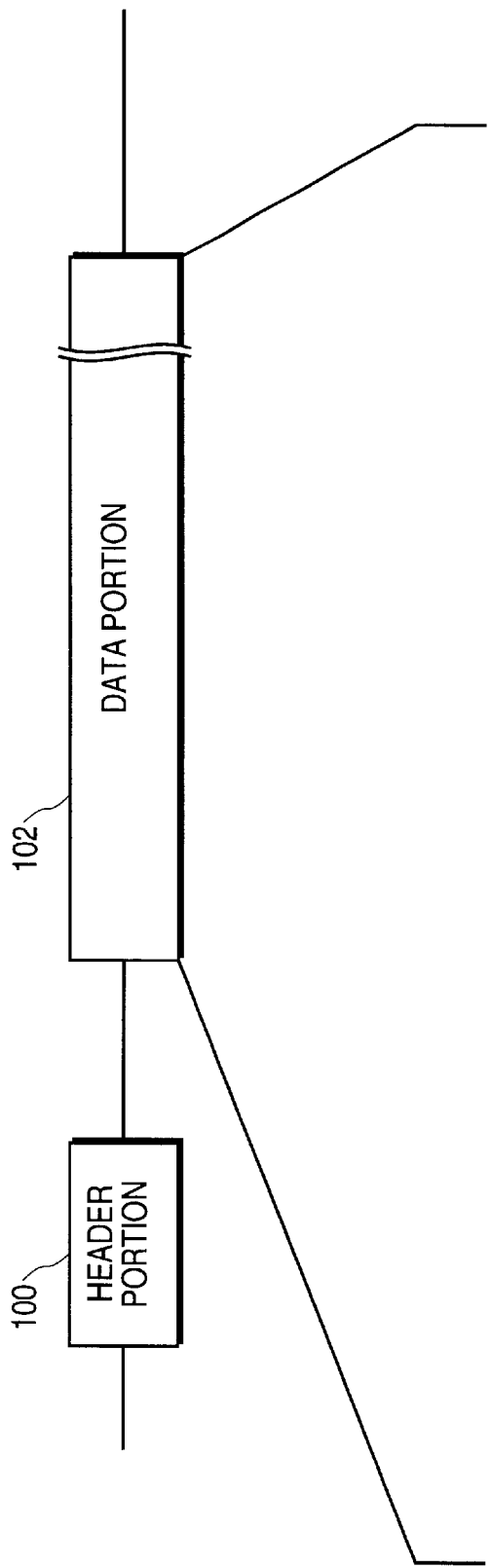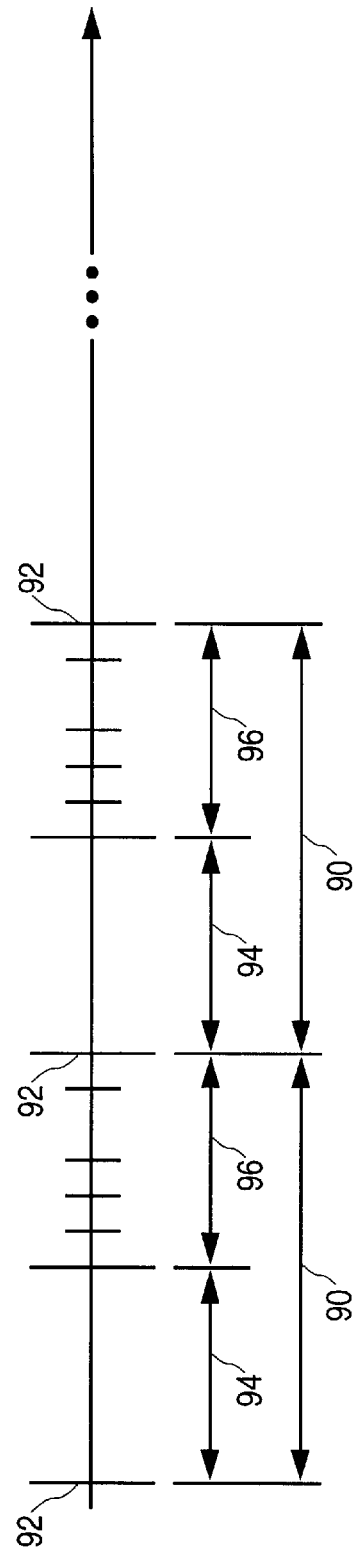
FIG. 9

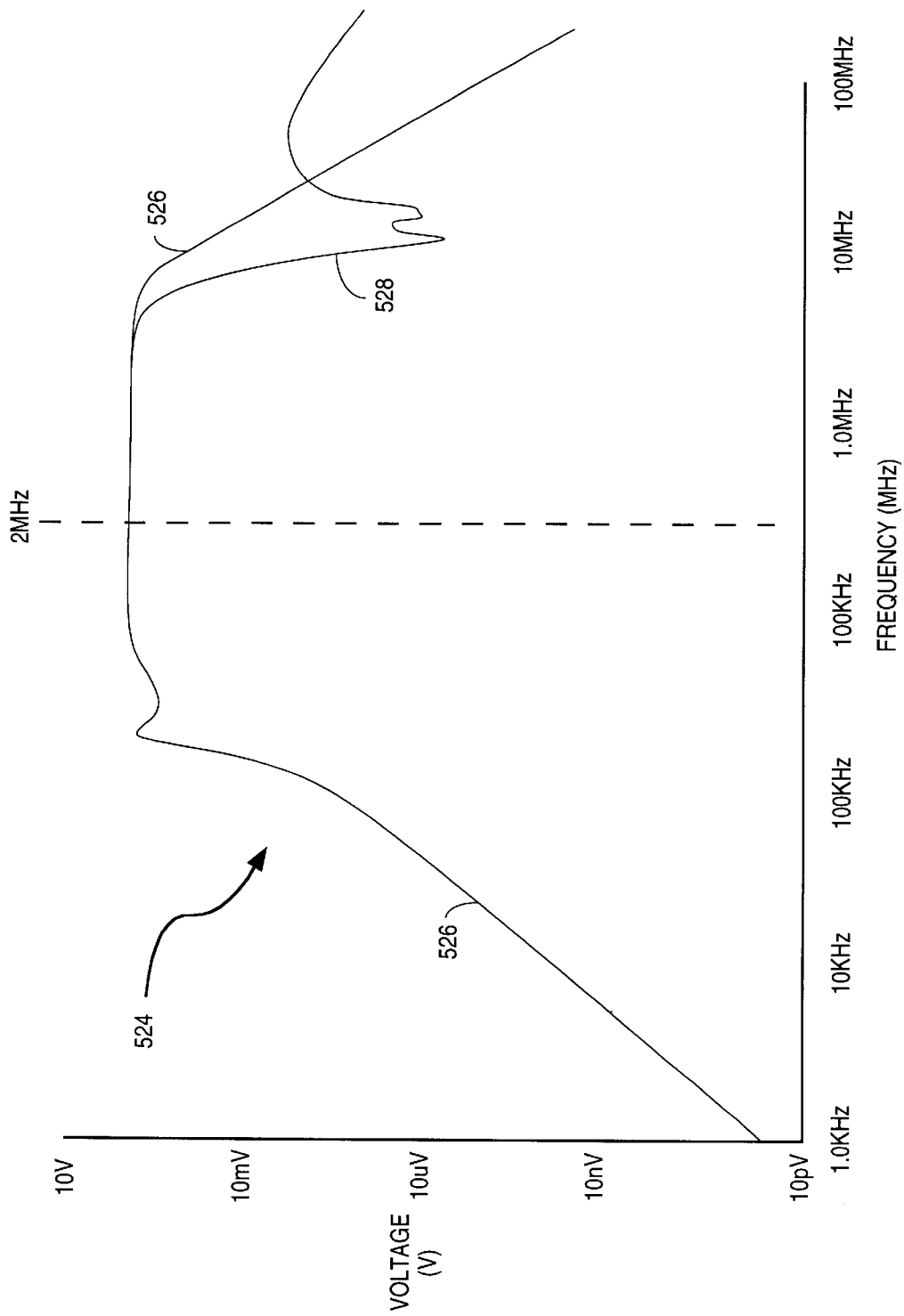

US 6,771,774 B1

FILTER ARRANGEMENT FOR SHAPING A PULSE PROPAGATED OVER POTS WIRING, AND A METHOD OF MANUFACTURING THE SAME

FIELD OF THE INVENTION

The present invention relates generally to filter arrangements and, more specifically, to a filter arrangement for shaping a pulse or signal propagated over POTS wiring to implement a networked computer environment.

BACKGROUND OF THE INVENTION

Nodes comprising a data network may transmit and receive information over a guided media, such as metal wire or fiber-optic cable, or an unguided media, such as by infrared or microwave. Copper cable is a relatively inexpensive, well-understood technology that is easily installed and is accordingly the cable of choice in a majority of network installations. However, copper cable suffers from various electrical characteristics that impose transmission limits. Types of copper cable that may be used to transmit digital signals comprise straight cable (i.e., copper wire surrounded by an insulated sheath), twisted-pair cable (i.e., a pair of copper wires that are twisted together to former pair) and coaxial cable (i.e., a solid copper core surrounded by insulator, a combination shield and ground wire, and an outer protective jacket).

A recent and emerging method of implementing a network within a home, office or multi-dwelling unit proposes utilizing existing and installed telephone cable within the structure as the medium via which nodes may transmit and receive information. Such telephone cable (a.k.a. Plain Old Telephone Service (POTS) wiring) is often Category 1 or Category 2 Unshielded Twisted-Pair (UTP) telephone cable, and may accordingly be particularly susceptible to background noise. Specifically, such cable is specifically susceptible to background noise generated by external sources, such as adjacent lines, dimmer switches, AC and DC motors and modems.

The utilization of POTS wiring as a communication medium within a network environment presents number of challenges. Specifically, the presence of ringing on the POTS wiring resulting from the assertion of a pulse on the wiring may have negative implications for the reliability and operability of a network implemented over POTS wiring.

SUMMARY OF THE INVENTION

According to a first aspect of the present invention, there is provided a filter arrangement for shaping a signal transmitted over POTS wiring. The filter includes an input to receive the signal, a high-pass filter, and a low-pass filter coupled to the high-pass filter. A trap filter is coupled to both the high-pass and low-pass filters, the trap filter operationally introducing a filter zero at a resonant frequency of the high-pass filter. An output couples the filter arrangement to the POTS wiring.

According to a second aspect of the present invention, there is provided a method of constructing a filter arrangement for shaping a pulse transmitted of the POTS wiring. A low-pass filter is coupled to a high-pass filter. A trap filter is then coupled to both the high-pass and low-pass filters, the trap filter operationally introducing a filter zero at a resonant frequency of the high-pass filter.

According to a third aspect of the present invention, there is provided a Network Interface Card (NIC), adapter or line card including a filter arrangement as described above.

Other features of the present invention will be apparent from the accompanying drawings and from the detailed description that follows.

BRIEF DESCRIPTION OF THE DRAWINGS

The present invention is illustrated by way of example, and not limitation, in the figures of the accompanying drawings in which like references indicate similar elements.

FIG. 9 is a diagrammatic representation of an exemplary data portion of a data transmission.

FIG. 29 is a plot showing exemplary transfer functions of a differential bandpass filter, included within the circuitry illustrated in FIG. 27, both without, and inclusive of, capacitors that constitute a trap filter arrangement.

DETAILED DESCRIPTION

A filter arrangement for shaping a pulse propagated over POTS wiring, and a method of manufacturing the same, are described. In the following description, for the purposes of explanation, numerous specific details are set forth in order to provide a thorough understanding of the present invention. It will be evident, however, to one skilled in the art that the present invention may be practiced without these specific details.

Apparatus-Overview

Figure 1A:
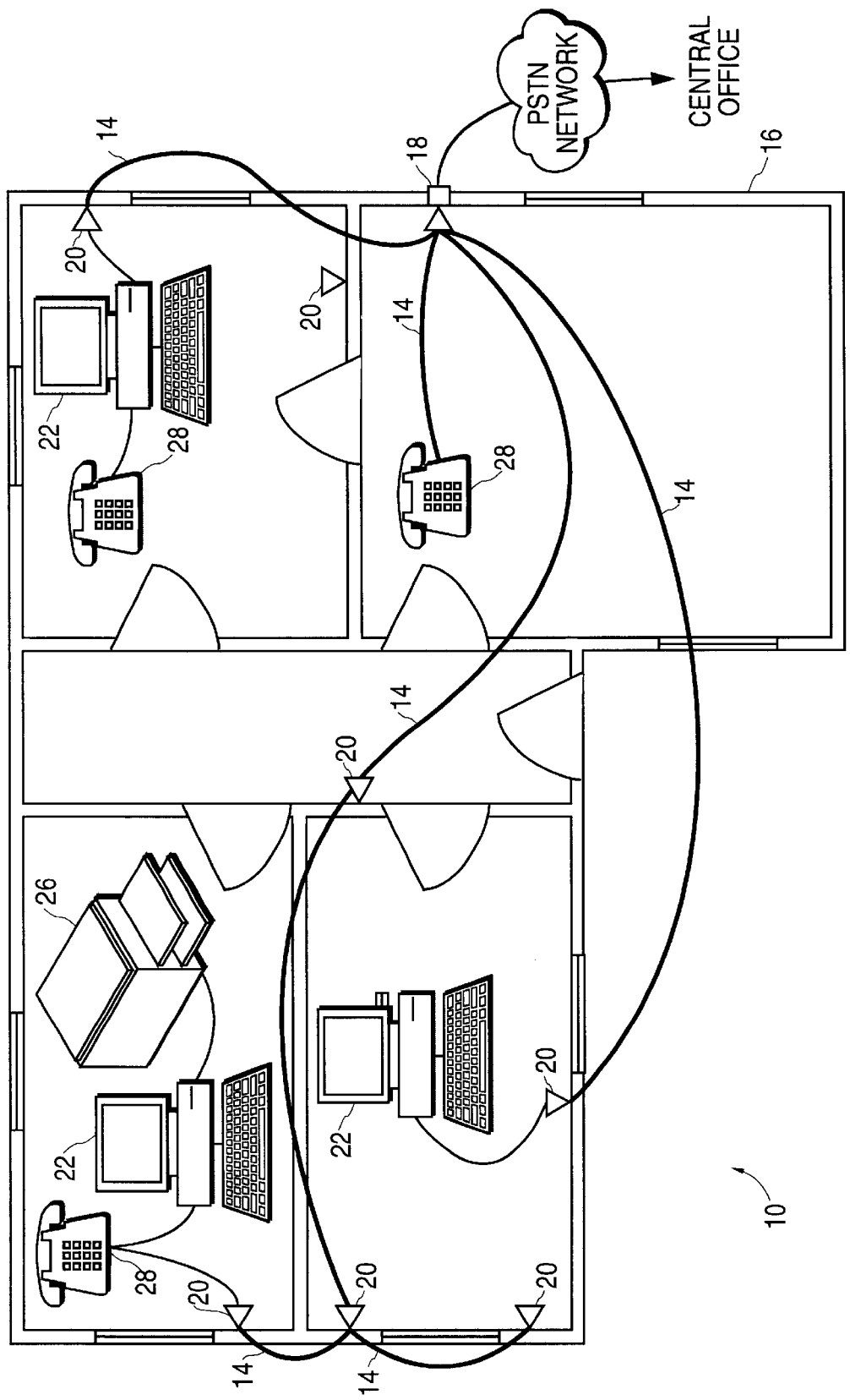
FIGS. 1A and 1B illustrate respective network environments (i.e., a home networking environment and a multi-dwelling unit environment) within which the present invention may be implemented.

FIGS. 1A illustrates a home networking environment 10 within which a network may be implemented utilizing arbitrary topology Plain Old Telephone Service (POTS) wiring 14, such as Unshielded Twisted-Pair (UTP) wiring. The networking environment 10 may be implemented in a building 16 that comprises a residential dwelling, apartment complex, hotel, multi-unit dwelling complex, small business office, or any other building within which a POTS wiring network exists. The wiring 14 fans out from a central connection point 18, through which the wiring 14 is connected to a central office, to numerous phone jacks 20 located throughout the building 16. A number of LAN devices (also termed "stations" or "nodes"), such as computers 22, modems 24 or printers 26 may be coupled to the wiring 14 via the jacks 20. Regular telephones 28 are also shown to be coupled to the wiring 14 via respective jacks 20. A number of branches of the wiring 14 may furthermore terminate in jacks 20 into which LAN devices or telephones are not connected (i.e., open stubs), and are accordingly unterminated. As will be appreciated from FIG. 1A, the wiring 14 interconnecting the LAN devices has an irregular topology, and includes a number of unterminated branches. Impedance mismatches, the arbitrary topology, and the lack of termination within the LAN 10 results in the reflection of signals and unpredictable frequency responses within the LAN 10. Further, the star configuration illustrated in FIG. 1A serves to attenuate the levels of signal features whose duration is short compared to the propagation delay of the wire branches.

Figure 1B:
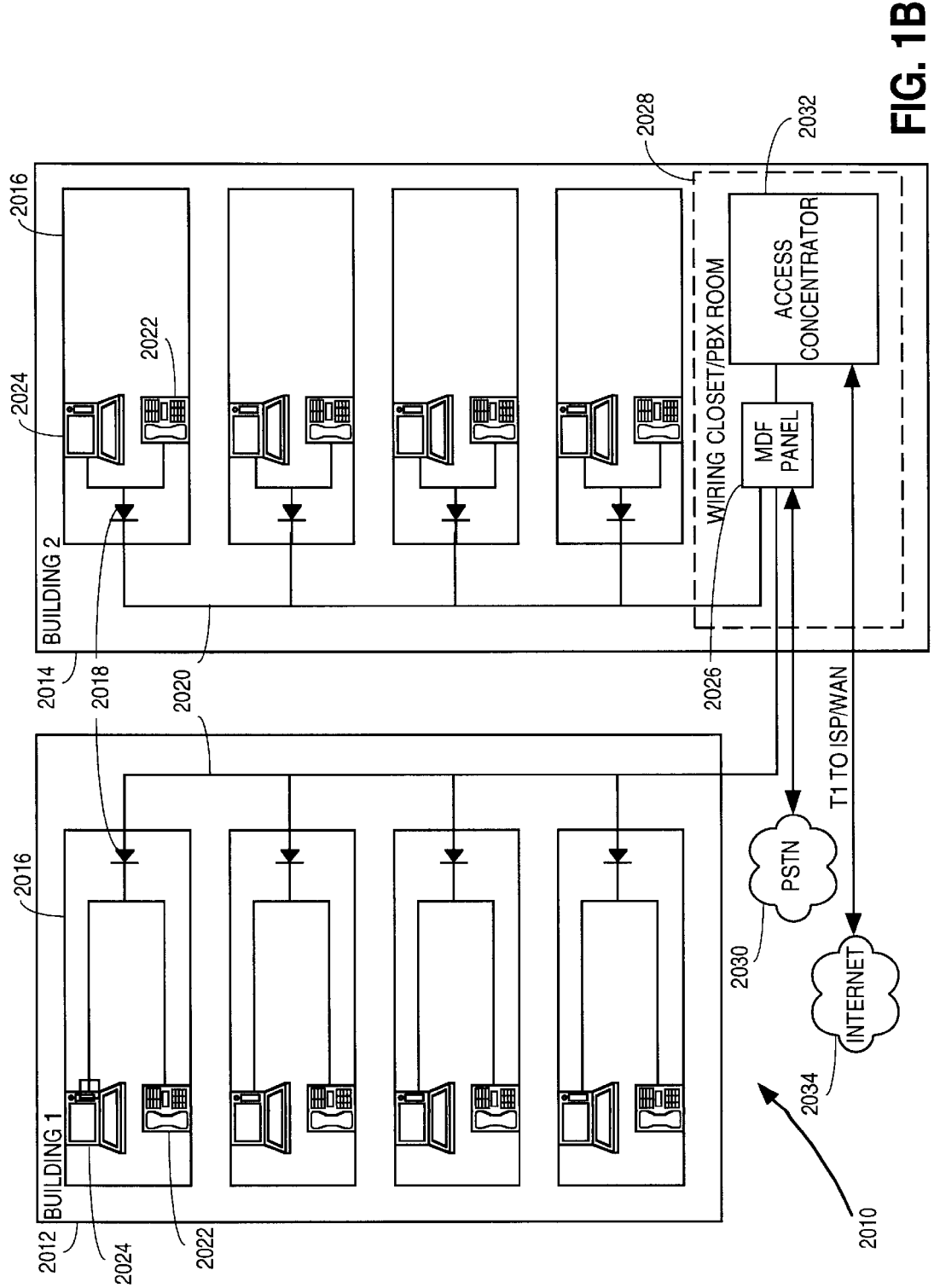

FIG. 1B is a diagrammatic representation of an exemplary multi-dwelling unit (MDU) environment 2010. The MDU within environment 2010 is shown to include two buildings 2012 and 2014, and each of the buildings 2012 and 2014 is shown to include number of units 2016, which may be apartments, hotel rooms, offices, or booths. The units 2016 may be located on multiple floors within each of the buildings 2012 and 2014. The MDU environment 2010 may be a high-rise apartment complex, garden-style apartment complex, hotel, or any other structure that includes discrete residential accommodations. The present invention may also be employed within office complexes, factories, exhibit halls or any other environment within which two or more devices may require networking.

Each unit 2016 is shown to include a network connection, in the exemplary form of an RJ-11 socket 2018 that is coupled to a carrier medium, in the exemplary form of Plain Old Telephone Service (POTS) wiring 2020. The wiring 2020 may comprise multiple Unshielded Twisted Pair (UTP) wire pairs utilized to establish a telephone connection network throughout the buildings 2012 or 2014. In this case, the wiring 2020 may be Category 1 or Category 2 wiring, as defined by the EIA/TIA 568 specification. Within each unit 2016, a regular telephone unit 2022 and a computer 2024 (via Network Interface Card (NIC), specialized "modem" or other form of adapter) are shown to be coupled to the wiring 2020 via a respective RJ-11 socket 2018. The wiring 2020 within each of the buildings 2012 and 2014 is shown to be coupled to a Main Distribution Frame (MDF) panel 2026, within a wiring closet 2028 of the building 2014. The MDF panel 2026 couples the wiring 2020 to the Public Switched Telephone Network (PSTN) 2030. The MDF panel 2026 is also shown to be coupled to an access concentrator 2032, which is constructed according to the teachings of the present invention, to provide access to the Internet 2034 to devices coupled to the wiring 2020, such as the illustrated computers 2024. While the present invention is described below within the context of a network implemented utilizing POTS wiring 2020 as a carrier medium, it will readily be appreciated that the teachings of the present invention may be implemented within any network environment within which switching occurs, such as a network utilizing a carrier medium that supports higher transmission rates, such as for example Category 5 cabling in the form of four-wire twisted-pair cable that can transmit data at 100 Mbps to support technologies such as Ethernet or Asynchronous Transfer Mode (ATM).

Figure 2:
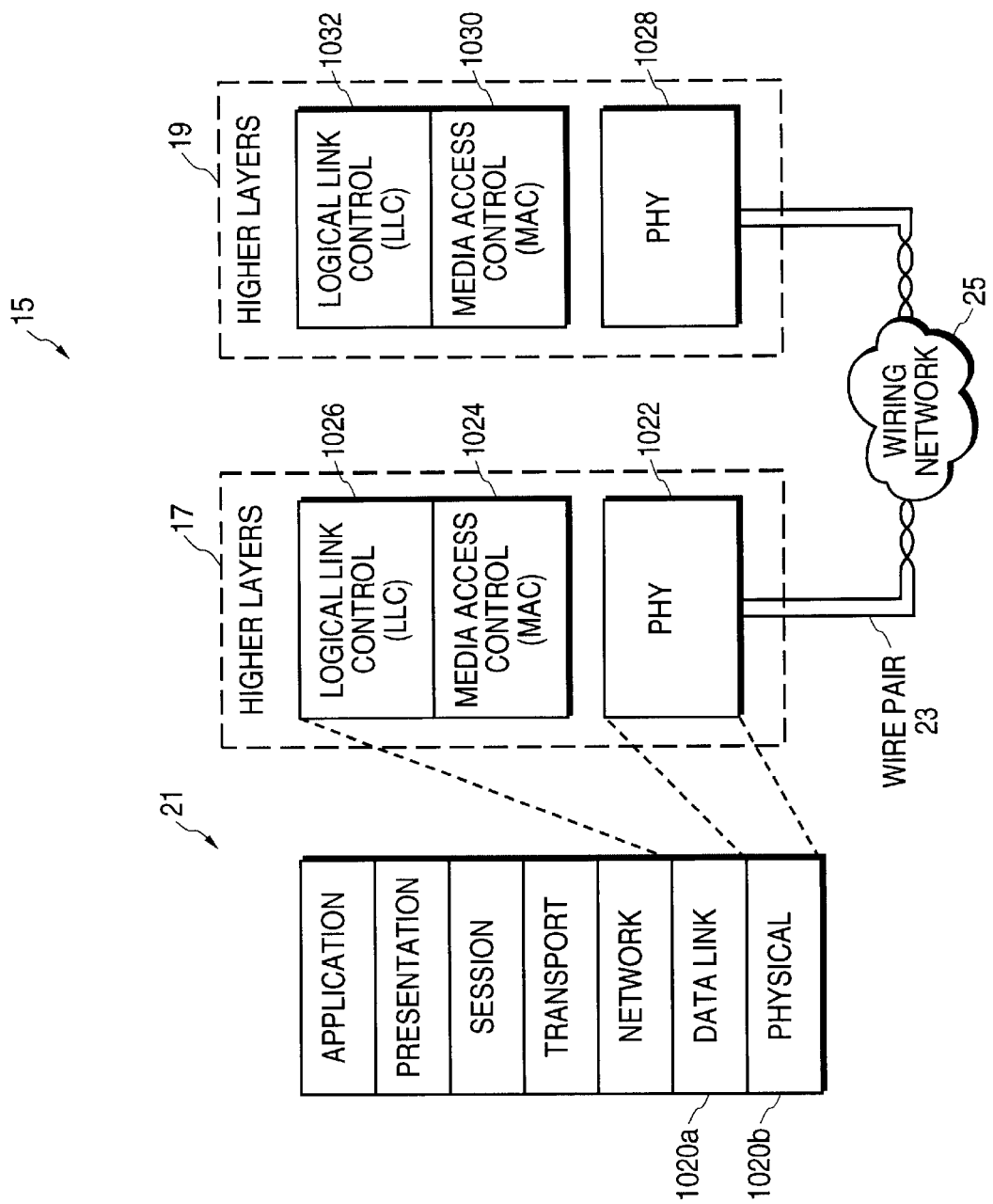
FIG. 2 is a diagrammatic representation of a mapping of networking device components to the OSI model.

FIG. 2 illustrates two exemplary networking devices 17 and 19, which are coupled via a wire pair 23 to a wiring network 25. Each of the networking devices 17 and 19 includes a physical layer device (PHY) 1022 or 1028, a media access controller (MAC) 1024 or 1030, and a logical link controller (LLC) 1026 or 1032. The various layers comprising the Open System Interconnect (OSI) networking model are illustrated at 21, and the PHY 1022 is shown to implement the physical layer 1020a while the MAC 1024 and the LLC 1026 are shown to implement the data link layer 1020b. In one embodiment, the present invention may reside primarily in the PHY 1022, and may adapt frames received from the MAC 1024 into a form suitable for reliable transmission over the wiring network 25 via the wire pair 23.

Figure 3:
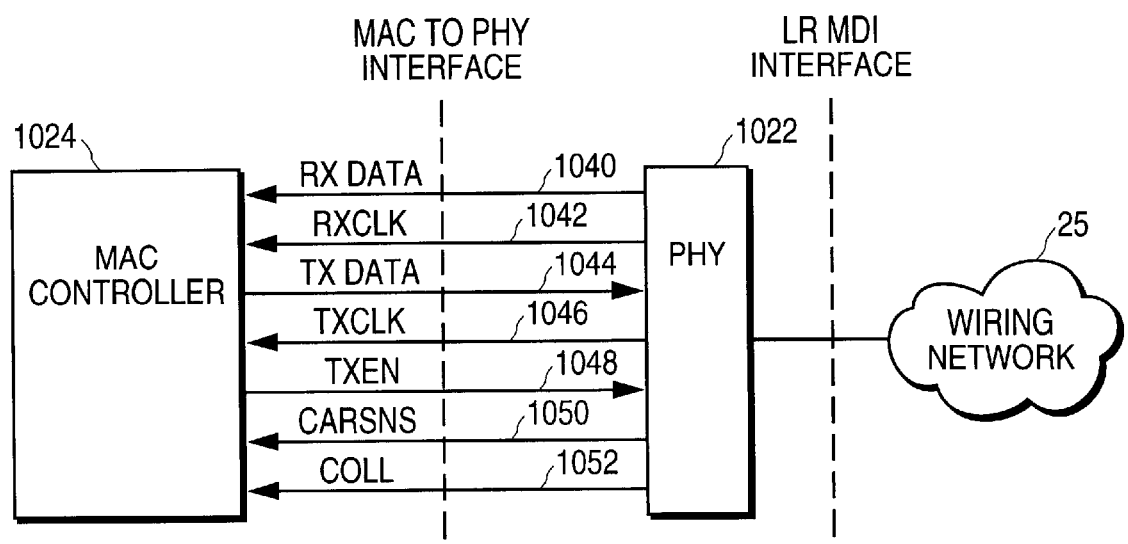
FIG. 3 is a diagrammatic representation of a MAC-to-PHY interface according to the present invention.

FIG. 3 provides further details regarding an exemplary embodiment of the MAC to PHY interface. Specifically, the interface includes a receive data signal 1040, which comprises data propagated to the MAC 1024 from the PHY 1022. A receive clock signal 1042 is utilized to clock the receive data signal 1040. A transmit data signal 1044 comprises data propagated from the MAC 1024 to the PHY 1022. A transmit clock signal 1046 is utilized to clock the transmit data signal 1044. A transmit enable signal 1048 comprises a request from the MAC 1024 to the PHY 1022 to begin the transmission of data to the PHY 1022. A carrier sense signal 1050 indicates to the MAC 1024 that the PHY 1022 is receiving a valid carrier signal from the wiring network 1018. Finally, a collision signal 1052 indicates that a collision was detected by the PHY 1022 on the wiring network 25.

While the MAC 1024 and the PHY 1022 are shown to be discrete components in FIG. 3, it will readily be appreciated that the MAC 1024 and the PHY 1022 may be integrated into a single device, in which case the above described signals will not be required. However, the functionality embodied in these signals should still be provided by the PHY component of any such integrated device.

Frame Structure-Overview

Figure 4:
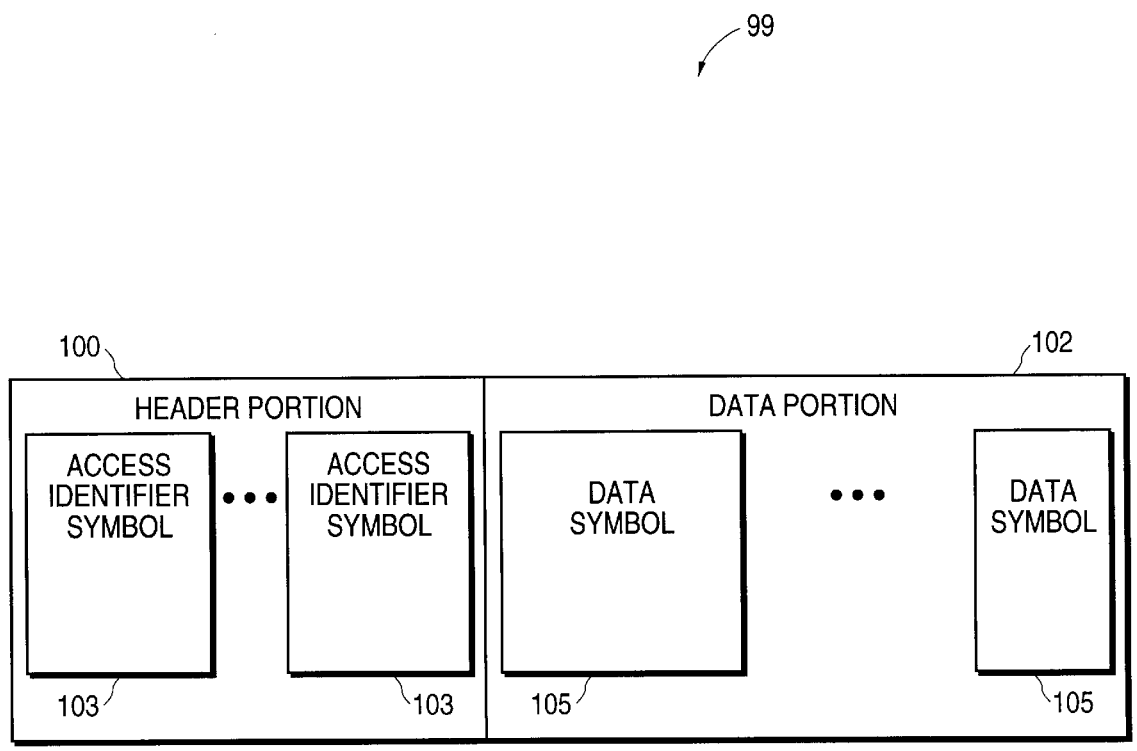
FIG. 4 is a diagrammatic representation of a frame constructed according to the teachings of the present invention.

FIG. 4 illustrates an exemplary embodiment of a frame 99 (or data packet) constructed by the PHY 1022, for transmission over the wire pair 23 within a structure. The frame 99 comprises a header portion 100 and a data portion 102, each of the header and the data portions 100 and 102 in turn comprising a series of symbols. Specifically, the header portion 100 includes a series of access identifier symbols 103, which may be of a fixed length. The data portion 102 comprises a series of data symbols 105, which are of a variable length and, in one exemplary embodiment, encode an IEEE 802.3 Ethernet data package received from the MAC.

Figure 5:
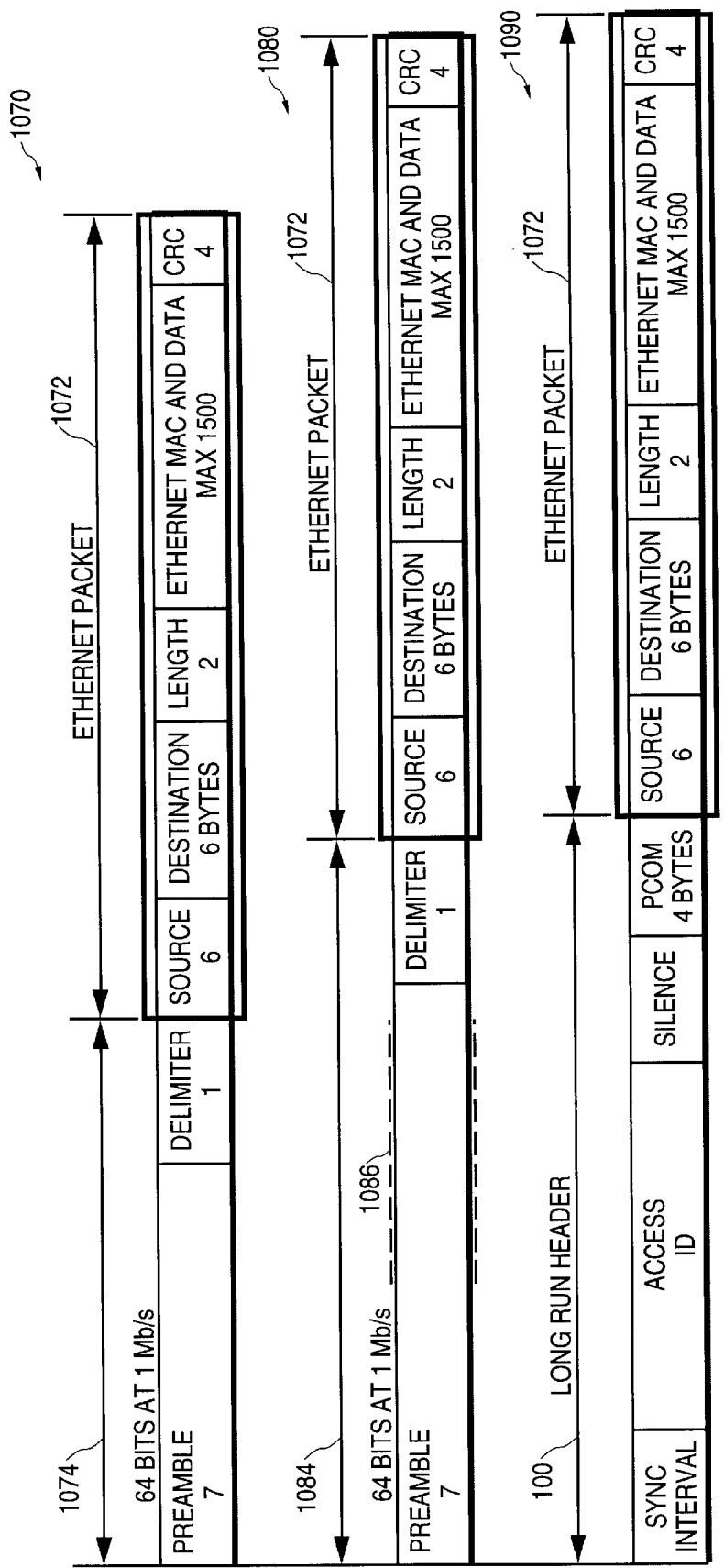
FIG. 5 is a block diagram showing the relationship between the MAC frame, and a frame constructed according to the teachings of the present invention.

FIG. 5 provides an exemplary illustration of the transformation of a transmission 1070, comprising a Ethernet packet 1072 having a preamble and delimiter 1074 prefixed to the Ethernet packet 1072, into a transmission 1090 for propagation over the wire pair 23. Specifically, the present invention proposes a method and apparatus whereby the PHY 1028 receives an Ethernet MAC frame (i.e., the transmission 1070) from the MAC 1024, strips away the eight octets comprising the preamble and delimiter 1074, and then replaces the preamble and delimiter 1074 with a header portion 100. Both the header portion 100 and the Ethernet packet 1072 are encoded as specific pulse sequences, as will be described in further detail below. In one exemplary embodiment, the step of transforming the transmission 1070 into the transmission 1090 comprises stretching the preamble and delimiter 1074 by introducing a "stretched clock" portion 1086 into the preamble to generate the intermediate header 1084, which comprises the contents of the delimiter and preamble 1074, but has a time duration of the header portion 100.

Modem

Figure 6:
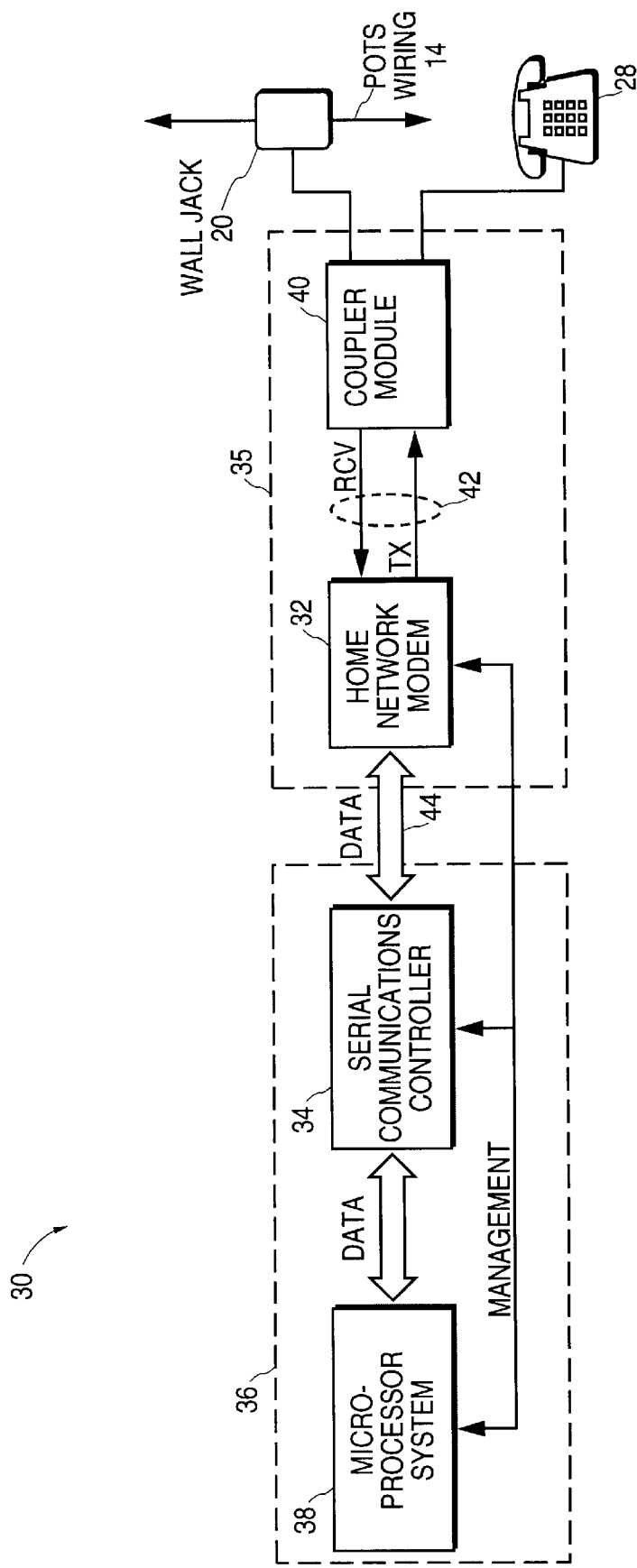
FIG. 6 is a block diagram illustrating a network station, including a modem, according to an exemplary embodiment.

Turning now to FIG. 6, there is illustrated an exemplary network station 30 coupled to a LAN via uncharacterized, arbitrary topology wiring, such as the POTS wiring 14 illustrated in FIG. 1. While the network station 30 is described below as implementing the Ethernet protocol, it will be appreciated that the teachings of the present invention can also be applied to other well-known networking protocols. Merely for example, the teachings of the present invention could be extended to any network implementing BISYNC or HDLC framing, Collision Detecting, Collision Avoiding, TDMA, and Polled or Token Passing access methods.

The network station 30 has a network device 36 and a physical-layer device (or PHY) in the form of an adapter 35. The adapter 35 includes a modem 32 that serves to adapt the transmissions of a serial communications controller 34 of the network device 36 (e.g., a computer) for propagation over the arbitrary POTS wiring 14.

The serial communications controller 34 may be an Ethernet communications controller operating according to the IEEE 802.3 standard High-level Data Link Control (HDLC) serial controller. In an alternative embodiment, the serial communications controller 34 may simply be a serial data interface or microprocessor, and the modem 32 may incorporate a Media Access Controller (MAC) that interfaces a data stream from the controller 34 to circuitry within the modem 32 via an interface such as the General Purpose Serial Interface (GPSI) 60 described below.

The modem 32 provides medium interface, signal encoding and decoding (ENDEC), clock recovery and collision detection functions. To accommodate a variable bit rate encoding/decoding scheme, and to control the flow the data between the network device 36 and the wiring 14, the modem 32 controls the clocking of data to and from the serial communications controller 34. The modem 32 may further support Carrier Sense Multiple Access/Collision Detection (CSMA/CD) based Media Access Control (MAC) layers and accordingly may provide carrier detect and collision indication signals. The modem 32 is furthermore shown to be coupled to a microprocessor system 38 of the network device 36 via a management interface, which allows the modem 32 to be controlled by software executing within the microprocessor system 38. The adapter 35 further incorporates a coupler module 40 by which the network station 30 is coupled to the jack 20 and POTS wiring 14. The coupler module 40 includes a pair of RJ-11 ports through which the wall jack 20 and the telephone 28 are coupled to the network device 36. The coupler module 40 is furthermore connected to the modem 32 via a transmit/receive connection 42.

Referring now to the network device 36, the serial communications controller 34 is typically responsible for Link-Layer protocol functions, such as framing, error detection, address recognition and media access. The microprocessor system 38 is responsible for the execution of software that controls the controller 34 and the modem 32. The microprocessor system 38 is furthermore shown to be coupled to the serial communications controller 34 via a data bus 44, and the communications controller 34 is similarly coupled to the modem 32.

The adapter 35 thus allows a network device 36 including a communications controller 34, such as for example an Ethernet controller, to be coupled to a LAN implemented using POTS wiring 14, and serves to encode header and data information transmitted from the network device 36 onto the LAN into a format suitable for propagation over the wiring 14. Similarly, the adapter 35 decodes signals received via the POTS wiring 14 into a format suitable for reception by the communications controller 34. While the adapter 35 is shown in FIG. 6 to reside outside the network device 36, it will be appreciated that the adapter 35 could in fact be incorporated within the network device 36 as, for example, part of a Network Interface Card (NIC). Alternatively, the adapter 35 may comprise a stand-alone unit that is coupled between a serial port of the network device 36 and the wall jack 20. The adapter 35 may furthermore be configured to facilitate communications over a predetermined maximum node separation difference. Specifically, within the home-networking environment 10 illustrated in FIG. 1A, the adapter 35 may be configured to facilitate communications between nodes having a maximum separation of 500 feet. An exemplary embodiment of such an adapter is the HomeRun™ adapter developed and manufactured by Tut Systems, Incorporated of Pleasant Hill, Calif. The HomeRun™ line cards and NICs are also examples of network devices incorporating substantially similar technology. In an alternative embodiment, the adapter 35 may also be configured to support network communications between nodes having a maximum node separation of up to 5,000 feet, in which case various configuration parameters of the adapter are modified to support communications over this longer distance. An example of such an adapter is the LongRun™ adapter. LongRun™ line cards and NICs may again include similar technology. The HomeRun™ and LongRun™ adapters, line cards and NICs are all manufactured by Tut Systems, Incorporated of Pleasant Hill, Calif.

Figure 7:
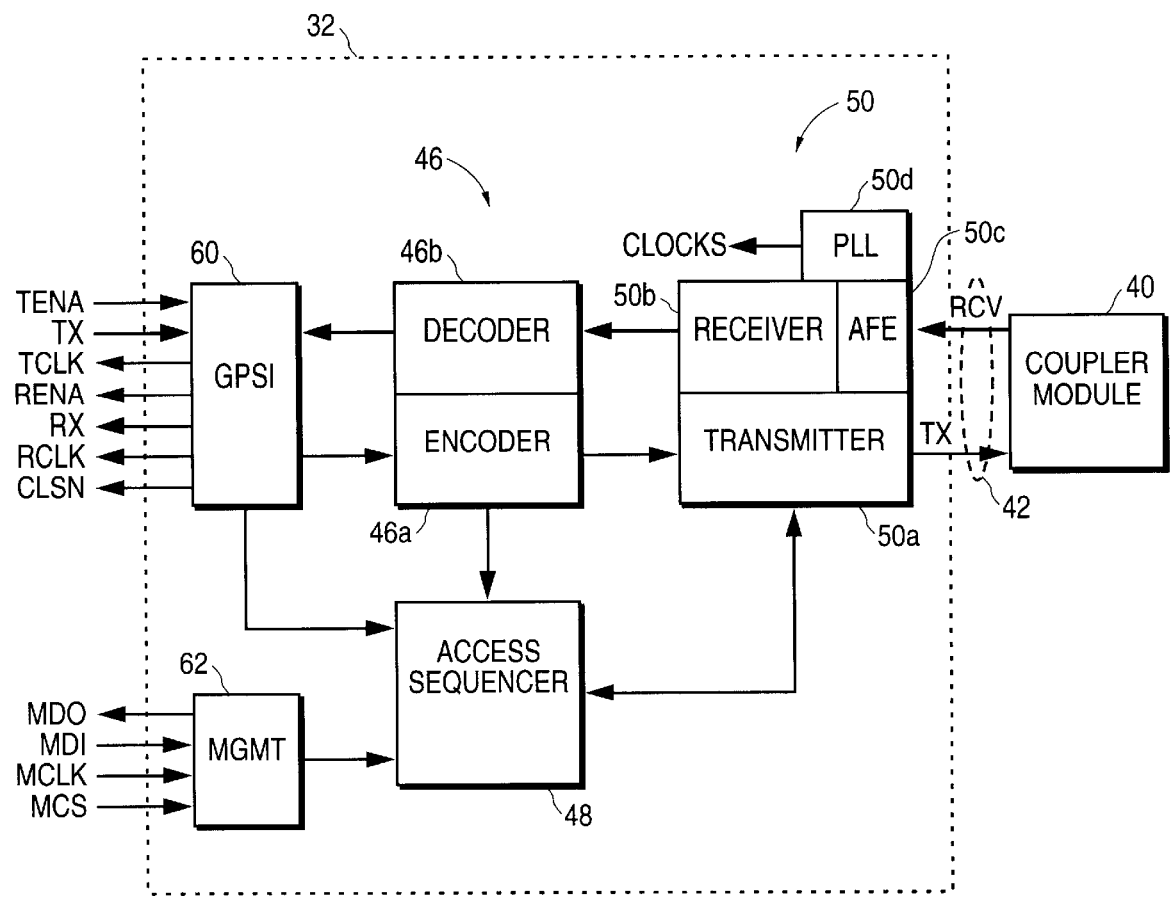
FIG. 7 is a block diagram illustrating further components that constitute the modem, according to an exemplary embodiment.

FIG. 7 is a block diagram providing a more detailed view of the components of the modem 32. Specifically, the modem 32 comprises an encoder/decoder (ENDEC) 46 that is responsible for encoding a bit sequence as a symbol for transmission over a carrier medium, such as the POTS wiring 14. Similarly, the ENDEC 46 is responsible for decoding a symbol received from the wiring 14 to generate a bit sequence. The ENDEC 46 furthermore supplies both transmit and receive clocks to the communications controller 34 or, in an alternative embodiment, to a MAC within the modem 32. Overall operation of the ENDEC 46 is under the control of an access sequencer 48. The access sequencer 48 selects a general mode of operation for the ENDEC 46 and for the modem 32 as a whole, and controls the flow of data between the modem's subsystems and interfaces. The access sequencer 48 is also responsible for implementing collision detection within the modem 32.

The modem 32 further includes transmitter/receiver (TX/RX) circuitry 50, which is responsible for the reception and transmission of (1) access identifier symbols 103 that encode unique identifiers for use in collision detection and (2) data symbols 105 that encode bit sequences. In one embodiment, such access identifier and data symbols 103 and 105 may be delimited by, or include, electrical pulses. A transmitter 50a within the circuitry 50 receives symbol and, in one exemplary embodiment, polarity information that is synchronized to a master clock from the ENDEC 46. In one embodiment, the data symbol information received at the transmitter 50a from the ENDEC 46 represents the variable-duration (or encoding) portion of a composite symbol to be propagated from the transmitter 50a. The transmitter 50a appends a fixed-duration (or buffer) portion to the variable-duration portion to generate the composite symbol. In one embodiment, the transmitter 50a then generates data symbol delimiters, which determine the time duration and polarity of the composite symbol, in the form of pulse waveforms. In one embodiment, each pulse waveforms comprises a pulse "doublet" while, in a second embodiment, each pulse wherefore comprises a multi-cycle waveform.

Each pulse doublet may include first and second portions of approximately equal duration and opposite polarity, and have a fixed pulse width. The polarity of each pulse doublet is determined by information received from the ENDEC 46. As each pulse doublet comprises two equal portions of equal duration and opposite polarity, no Direct Current (DC) component is generated on the wiring 14 when the pulse doublet is transmitted thereon. Compliance with FCC Part 68 requires that the voltage levels of each pulse doublet be substantially less than would be generated when driving the coupler module 40 at Transistor-Transistor Logic (TTL) levels. A reduction in the voltage levels of each pulse may be accomplished by incorporating a series of resistors, or step-down windings, in a coupling transformer within the circuitry 50. Each pulse doublet may be a single cycle of a 2 MHz sine wave.

The TX/RX circuitry 50 also includes a receiver 50b, which includes gain elements, comparators and digital control circuitry. The receiver 50b produces an output pulse, coincident with a predetermined point, or voltage, of a complex waveform received by the wall jack 20 off the wiring 14. The complex waveform may be highly attenuated and distorted as a result of being propagated through a residential POTS wiring 14, and reflections can result in a peak amplitude occurring sometime after arrival of the incident energy. Without line terminations and with complex topologies, pulse energy may continue for many microseconds, decaying gradually. The TX/RX circuitry 50 further includes an Analog Front End (AFE) circuit 50c and a Phase-Lock Loop (PLL) circuit 50d. The AFE 50c shapes transmit pulses, and finds and indicates to the receiver 50b the time (temporal) location of a predetermined point or threshold voltage (e.g., the incident peak) of a received waveform for the purposes of identifying the access identifier and data symbols 103 and 105. Further details regarding the detection threshold voltages used for the identification of the access identifier and data symbols are provided below.

Referring again to FIG. 7, the modem 32 also includes system interfaces in the form of a General Purpose Serial Interface (GPSI) 60 and a management interface 62. The GPSI 60 allows the modem 32 to control the clocking of data into and out of the communications controller 34.

A management interface 62 is a simple 4-wire serial interface for setting and reading management configuration information. A microprocessor within the communications controller 34 uses the interface 62 to establish the speed of operation, and to set the access sequencer's 48 mode of operation. In one embodiment the communications controller 34 is an Ethernet controller, and the management parameters for the modem 32 are stored in a serial EEPROM, and loaded automatically every time the controller 34 is reset or initialized.

Frame Structure—Access Identifier Symbols

A collision detection protocol is implemented within the network environments 10 and 2010, such as those illustrated in FIGS. 1A and 1B, which may have an arbitrary topology and unterminated branches. In one exemplary embodiment, a network environment 10 implements the Ethernet protocol and thus a CSMA/CD mechanism is invoked for every transmission over the network environment 10. In such a network environment 10, each network station 30 includes an Ethernet communications controller 34, which provides the CSMA/CD mechanism. However, as detailed above, an arbitrary topology renders traditional collision detection methodologies unreliable. Specifically, the occurrence of reflections and noise on a network using POTS wiring as a carrier medium render traditional "carrier sense" methodologies and techniques unreliable. Accordingly, the present invention proposes that the adapter 35, as shown in FIG. 6, provide a "front-end" for the communications controller 34 which allows the detection of collisions in a manner that compensates for the unpredictability and arbitrary nature of a carrier medium.

Merely for example, assuming that a maximum node separation of 500 feet is specified in the network environment 10 shown in FIG. 1B, a "slot time" of no more than 2 microseconds may exist. In the network environment 2010, a maximum node separation of 5,000 feet may be specified, resulting in a "slot time" of no more than 9 microseconds. The term "slot time" may comprise twice the propagation delay between nodes (i.e., "round-trip" propagation delay), and indicates the maximum amount of time required by a node to capture the carrier medium. In order to facilitate the detection of signals transmitted by multiple stations within such a slot time, the present invention proposes assigning a unique access identifier, for example in the form of an eight-bit binary number, to each station. This access identifier is a unique identifier, and is transmitted from each station as part of the header portion 100 prior to the transmission of the data portion 102.

The generation and transmission of a frame 99, such as that illustrated in FIG. 4, typically commences when the communication controller 34 indicates to the modem 32 a desire to transmit by raising a transmission enable (TENA) signal. If the carrier medium is detected as being available (e.g., no transmitted pulses from other nodes have been seen on the POTS wiring 14 for N microseconds), the access sequencer 48 causes the transmitter 50a to transmit the header portion 100, which includes the access identifier unique to the transmitting network station. The access identifier is substituted for a portion of a preamble transmission, which is conventionally transmitted from an Ethernet MAC controller at the beginning of a packet, as illustrated in FIG. 5.

For the purposes of the specification, it is convenient to define a time unit in terms of which time intervals and temporal locations may be expressed. To this end, a time unit arbitrary termed a TIC is defined as comprising 0.1167 microseconds in one embodiment of the present invention (e.g., in a HomeRun™ embodiment). In an alternative embodiment, a TIC may be defined as 0.52515 seconds (e.g., in a LongRun™ embodiment).

Figure 8:
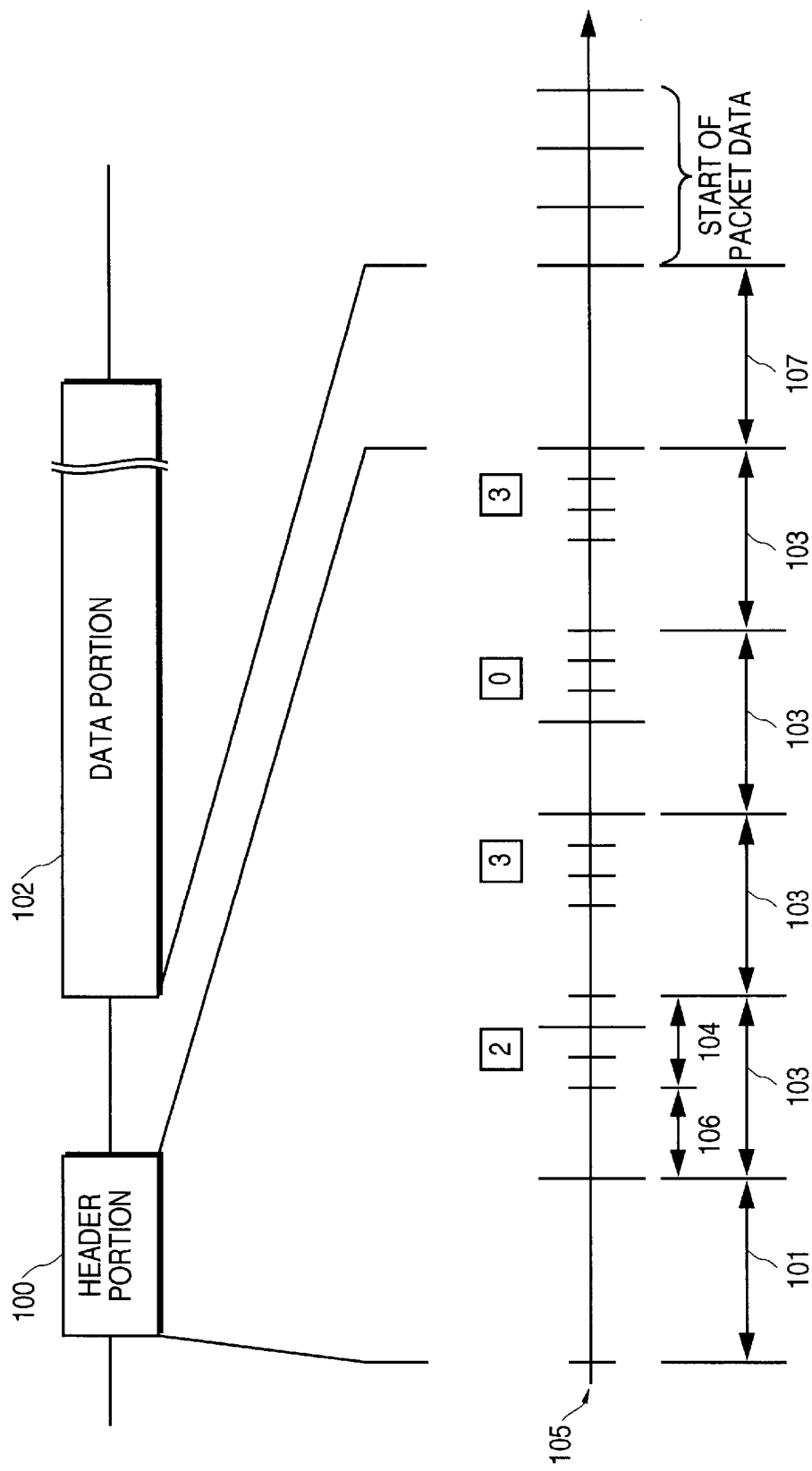
FIG. 8 is a diagrammatic representation of an exemplary header portion of a data transmission.
Figure 13:
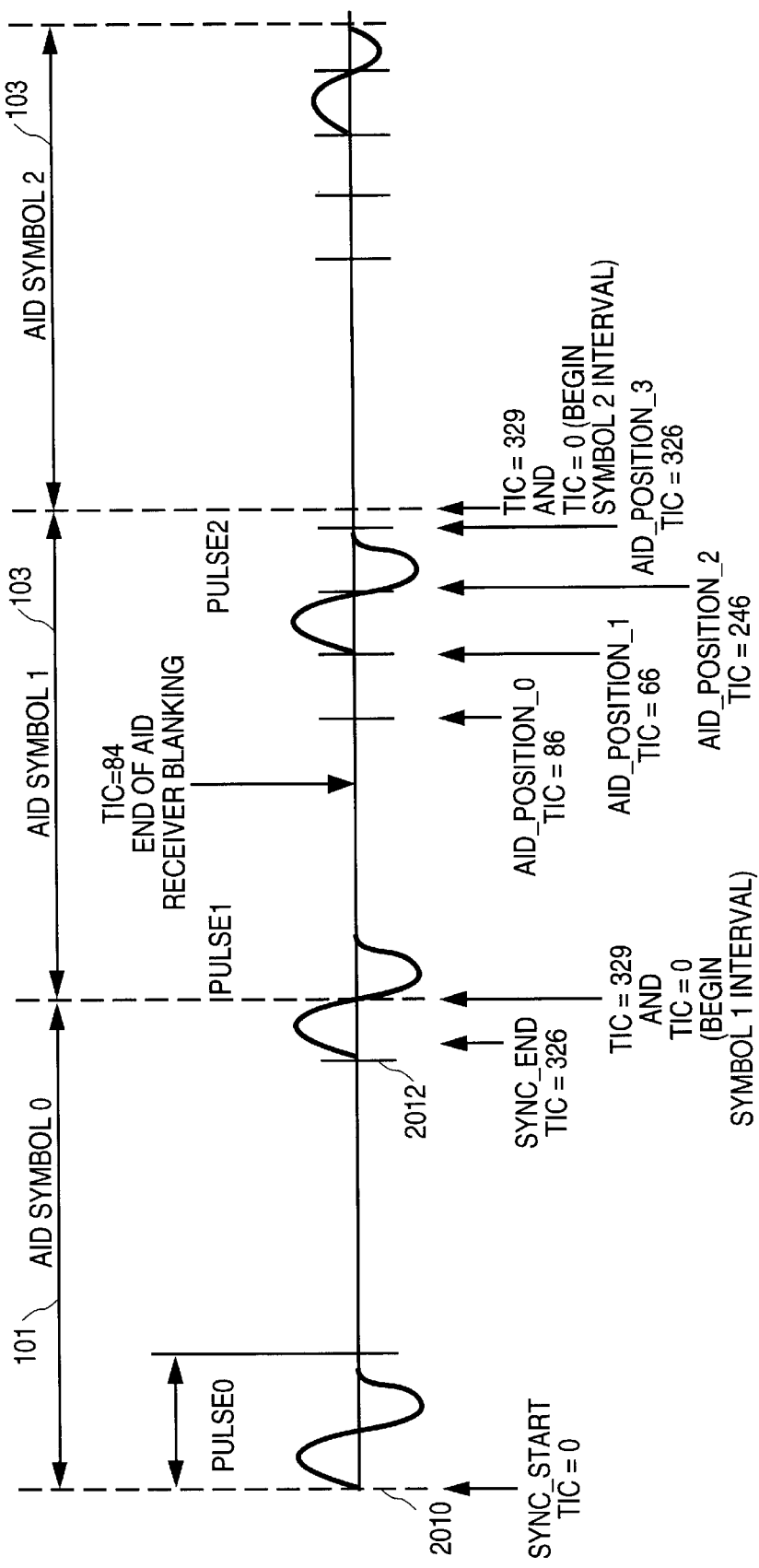
FIG. 13 is a diagrammatic representation of a synchronization interval, and two access identifies symbols, as may be propagated from a transmitter, according to an exemplary embodiment.

As shown in FIGS. 8 and 13, in one exemplary embodiment the header portion 100 comprises a synchronization interval 101, at least four (4) access identifier symbols 103, and a silence interval 107. The synchronization interval 101 is of a fixed length (e.g., 329 TICs), and is bounded by two electrical pulses that may be 326 TICs apart. The four access identifier (AID) symbols 103 are of equal duration (e.g., 329 TICs) and each comprise a buffer or blanking interval 106 and an identifier portion 104. Each exemplary blanking interval 106 may be 86 TICs in duration. An AID symbol pulse may occur at one of four TIC positions within an AID symbol 103, these are: 86, 166, 246, or 326 TICs. The end of a symbol 103 may occur at TIC=329. Exemplary blanking intervals 106 are further defined and explained in co-pending U.S. patent application Ser. No. 08/925,205, entitled "METHOD AND APPARATUS FOR ENCODING AND DECODING A BIT SEQUENCE FOR TRANSMISSION OVER POTS WIRING", filed Sep. 8, 1997, which is incorporated by reference into the present specification. The respective blanking intervals 106 are required to separate the pulses included within the identifier portions 104 by a predetermined time duration so as to allow for proper detection thereof by a receiver 50b.

Two bits are encoded in the temporal location of a symbol within each identifier portion 104. For example, a pulse transmitted in the 86th TIC of a symbol 103 encodes the bit sequence "00". Similarly, the bit sequences "01", "10", and "11", are encoded by pulses transmitted in the 166th, 246th and 326th TICs within a symbol 103. For example, the identifier portion 104 of the first access identifier symbol 103 includes a pulse transmitted in the 246th TIC of the symbol 103b, and thus encodes the bit sequence "10".

The silence interval 107 may also be 329 TICs in duration, and is used for the detection of a "jam" pattern, and it is during this silence interval 107 that all receivers 50b may attain maximum sensitivity. FIG. 13 illustrates further details regarding the shape and form of an exemplary embodiment of a symbol pulse.

As described in co-pending U.S. patent application Ser. No. 08/925,043 entitled "METHOD AND APPARATUS FOR DETECTING COLLISIONS ON A NETWORK, filed Sep. 8,1997, which is incorporated by reference into the present specification, the ENDEC circuitry 46 may utilize the header portions 100 of received frames 99 to detect collisions over a network implemented on POTS wiring 14. In summary, by comparing the temporal locations of pulses of a received header portion 100 with the temporal locations of pulses within a transmitted header portion 100 unique to a respective network device, and detecting any variations between the temporal locations of corresponding pulses within such header portions 100, the modem 32 is able to detect collisions in the manner detailed in the above identified co-pending U.S. patent applications.

Frame Structure—Data Symbols

In seeking to address the problem of unreliable transmission over a network having an arbitrary topology and unterminated nature (e.g., a POTS wiring network), the present invention teaches encoding data (e.g., an Ethernet packet) as a sequence of data symbols 105 that together constitute the data portion 102 of a frame 99, as illustrated in FIG. 4. In one embodiment, each data symbol 105 is distinguished by having a specific time duration, this time duration being determined by the time interval between the generation (or receipt) of first and second delimiters in the exemplary form of pulse waveforms. More specifically, data is encoded in the precise time between the generation (or arrival) of short duration pulses that are widely separated in time.

As shown in FIG. 9, in one exemplary embodiment, the data portion 102 includes a sequence of data symbols 90 that may each be of varying duration, and which are defined by a sequence of pulses 92 transmitted from a receiver 50b over the POTS wiring 14. Each data symbol 90 has a predetermined duration that is indicative of a predetermined bit sequence. A minimum time duration separates each of the pulses 92 from a preceding pulse, so as to allow reflections resulting from the pulse 92 on the POTS wiring 14 to decay below a predetermined threshold before transmission of a subsequent pulse 92. This minimum time duration is embodied in a fixed-duration blanking interval 94 that proceeds the generation of each pulse 92. Following the blanking interval 94, each data symbol 90 then includes a variable-duration symbol portion 96 that encodes the predetermined bit sequence. Each symbol portion 96 is demarcated by (1) the end of a preceding banking interval 94 and (2) a pulse 92 that is generated in one of twenty-four temporal locations, each of the twenty-four temporal locations being indicative of a predetermined bit sequence, as described in co-pending U.S. patent application Ser. No. 08/925,205. For example, the second pulse 92 shown in FIG. 9 may be located at a 7th location, while the third pulse 92 may be located at the 12th location. In this case, the symbol portion 96 of the first data symbol 90 will be shorter in time duration than the symbol portion 96 of the subsequent data symbol 90.

Pulse Shapes—Pulse Doublet and Multicycle Waveforms

Figure 10:
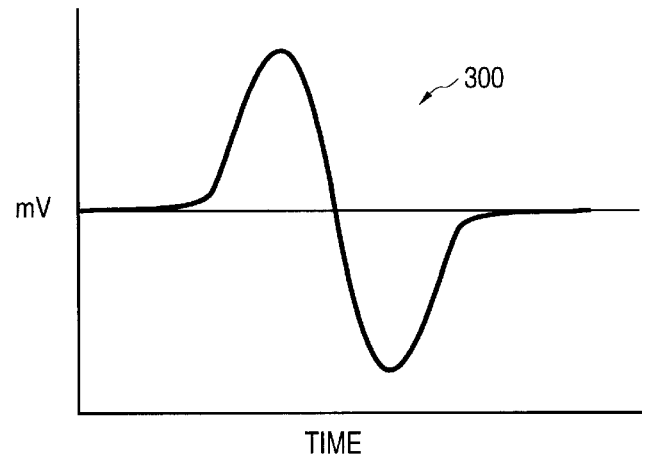
FIG. 10 illustrates an exemplary delimiter in the form of a pulse doublet.

The pulses included within the access identifier symbols 103, and which comprises the delimiters of the data symbols 105, may comprises pulse doublets, as shown at 300 in FIG. 10. The pulse doublets 300 each include two equal portions of equal duration and opposite polarity, so that no direct current (DC) component is generated on a wire pair 23 when the pulse doublet is transmitted thereon. A number of pulse doublets 300 may together constitute a waveform having, in one embodiment, a frequency of 2 MHz.

Figure 11:
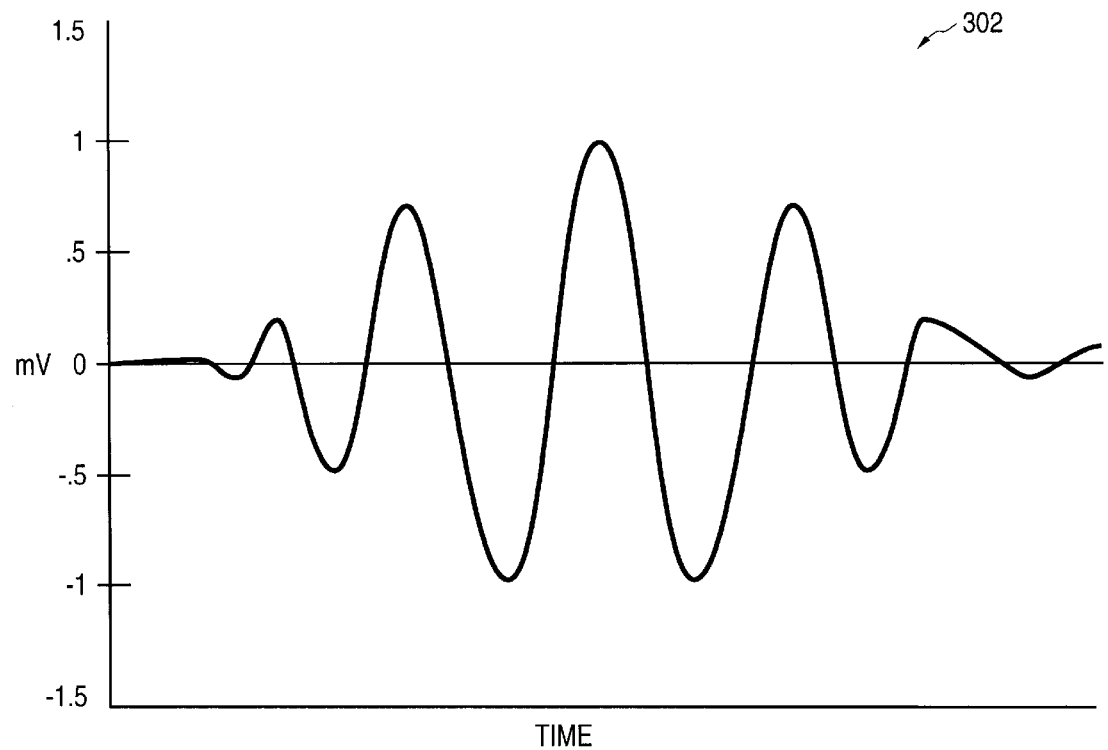
FIG. 11 illustrates an exemplary delimiter in the form of a multi-cycle waveform.
Figure 12:
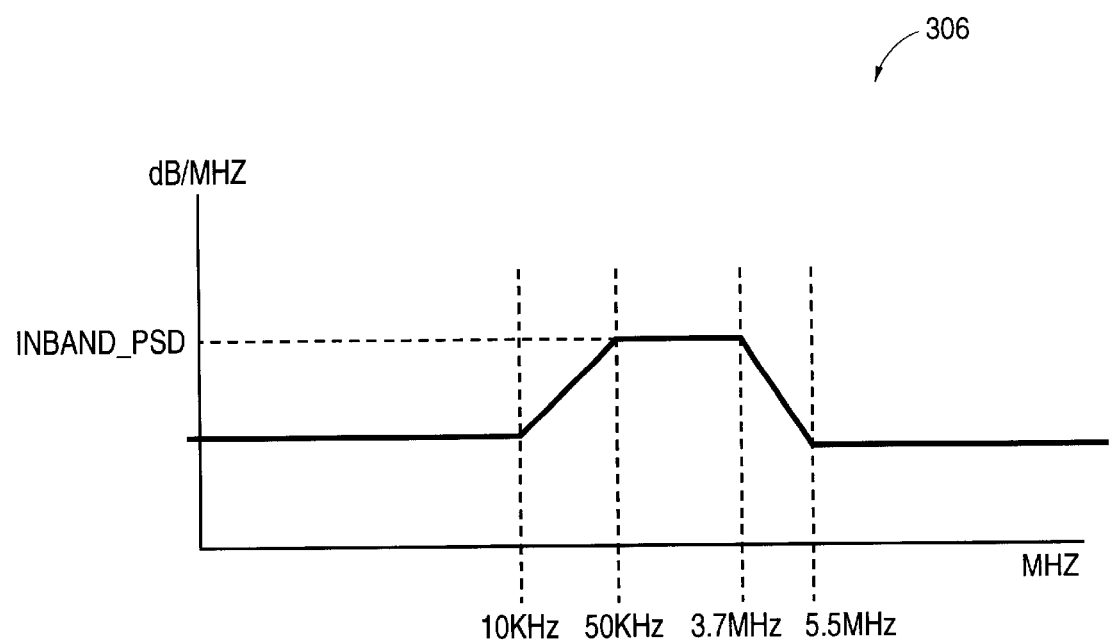
FIG. 12 illustrates an exemplary spectral mask to which the output power spectrum of a transmitter within the modem, illustrated in FIG. 7, may conform.

In an alternative embodiment of the present invention, a pulse constituting a delimiter may take the form illustrated in FIG. 11. Specifically, each pulse may comprise a multi-cycle waveform 302. FIG. 12 illustrates a spectral mask 306 to which the output power spectrum of a transmitter 50a may conform. The power level requirements specified by the spectral mask are below 1.1 MHz to allow the modem 32 to interoperate with Analog Digital Subscriber Line (ADSL) modems.

In one exemplary embodiment of the present invention, delimiters in the form of the pulse doublets shown in FIG. 10 may be utilized to implement an embodiment of the invention that facilitates communication between nodes having a maximum node separation of 2,000–5,000 feet. Such an exemplary embodiment may be utilized, for example, to implement a LongRun™ adapter, line card or NIC described above. The frequency of the pulse doublet 300 may, in this embodiment, be 2MHz.

In an alternative embodiment of the present invention, delimiters may each comprise the multi-cycle wave from 302, shown in FIG. 11. Such an embodiment may be utilized to implement, merely for example, the HomeRun™ adapter, line card or NIC developed by Tut Systems, Inc.

FIG. 13 is a diagrammatic representation of an exemplary synchronization interval 101, and two exemplary access identifier symbols 103, as propagated from the transmitter 50a. Each of the pulses in the exemplary embodiment is shown to comprise a pulse doublet 300 such as that shown in FIG. 10.

Noise, Data and Peak Threshold Levels

Figure 14:
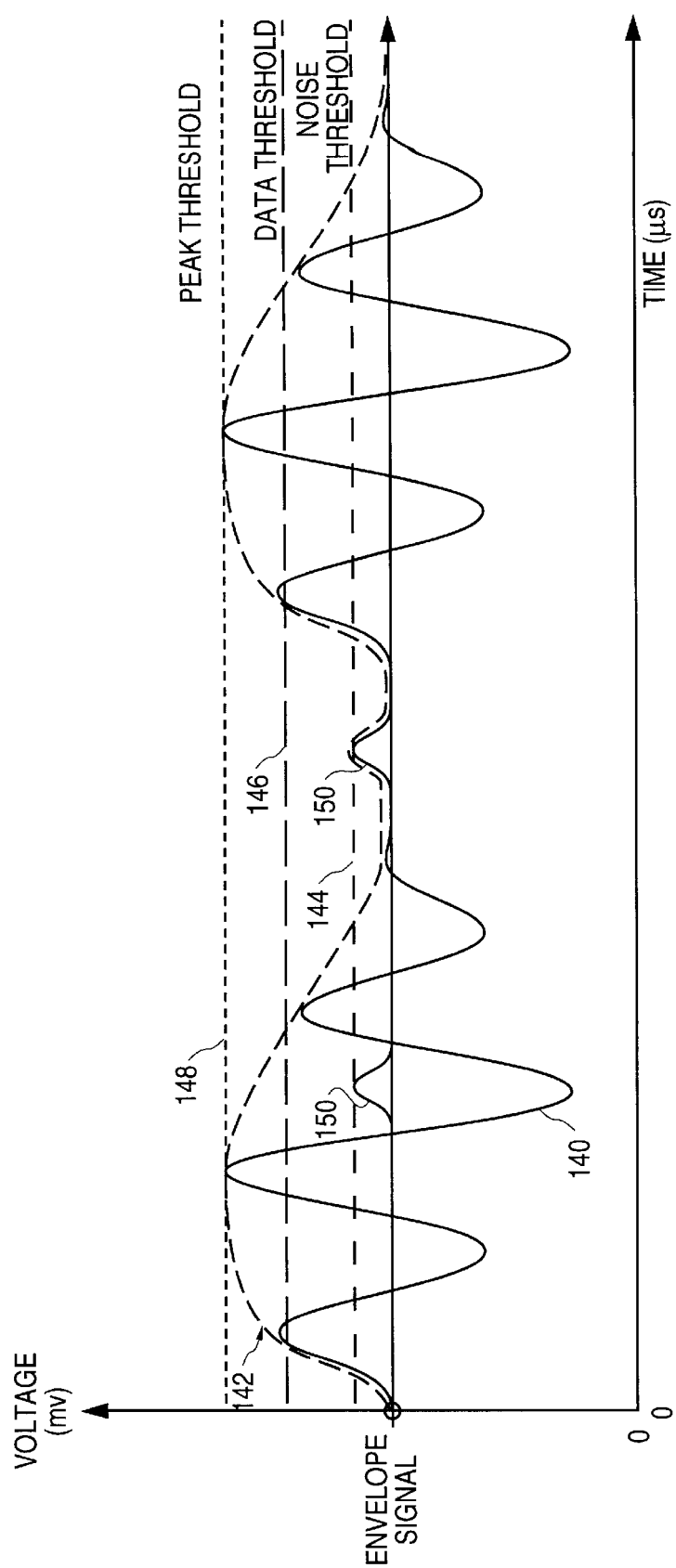
FIG. 14 is a signal diagram illustrating an exemplary multi-cycle waveform, a derived envelope signal, and exemplary peak threshold, data threshold, and noise threshold levels as determined for detection of the envelope signal.

As discussed above with reference to FIG. 4, a frame 99, constructed by the PHY 1022, includes a header portion 100 and a data portion 102. The header portion 100 is utilized for the purposes of, inter alia, synchronization and collision detection, while the data portion 102 is utilized for the actual transmission of data. In order to allow for the detection of collisions with packets emanating from distant nodes on the wiring network, it is desirable that the sensitivity of the receiver 50b be maintained at a high level during collision detection (i.e., during reception of a header portion 100). On the other hand, in order to reject noise impulses and the decaying remnants of a previous pulse, it is desirable that the sensitivity of the receiver 50b be at a lower level during reception of a data portion 102. To this end, three (3) threshold levels may be implemented within the receiver 50b that allow the receiver 50b to utilize different levels of sensitivity during the detection of the header portion 100 and during the detection of the data portion 102. Referring now to FIG. 14, there are illustrated two exemplary signals that have been superimposed on each other, namely a received waveform 140 and a unipolar pulse waveform 142 (hereafter referred to as an envelope signal 142) that comprises a detected envelope of the waveform 140. Three threshold levels are also shown to be traversed by the envelope signal 142, namely a noise threshold level 144, a data threshold level 146 and a peak threshold level 148. The noise threshold level 144 is shown to be ideally situated just above a measured noise floor, represented by noise pulses 150 and, as will be explained in greater detail below, may be adjusted to track an ambient noise level.

The Transmitter Receiver Circuitry (TX/RX)

1$^{st}$ Embodiment

Figure 15:
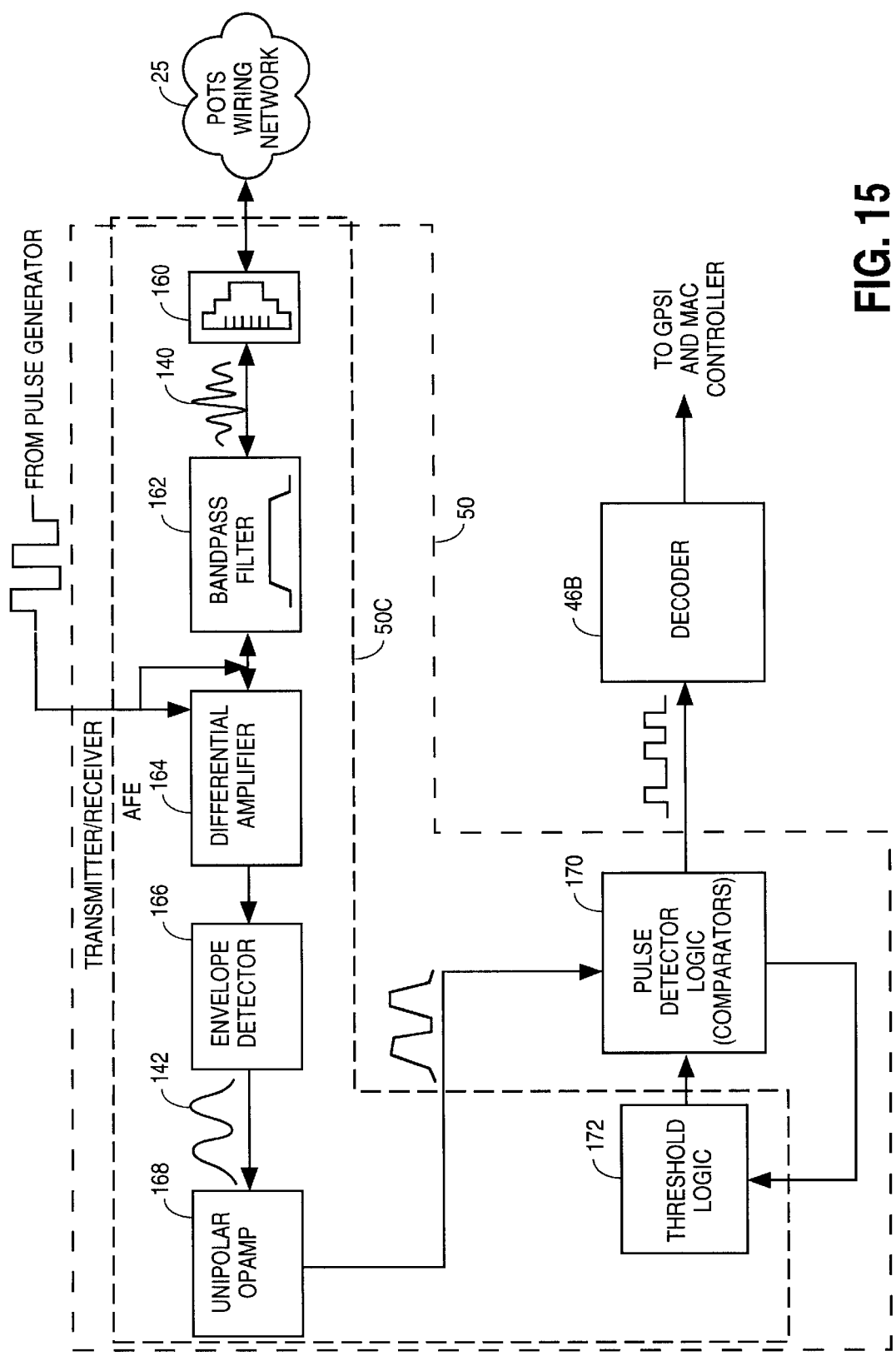
FIG. 15 is a block diagram illustrating further component details for a first exemplary embodiment of transmitter/receiver (TRX/RX) circuitry, included within the modem illustrated in FIG. 7.

FIG. 15 is a block diagram illustrating further component detail of an exemplary embodiment of the TX/RX circuitry 50. Specifically, the exemplary embodiment illustrated in FIG. 15 comprises components of the TX/RX circuitry 50 for implementing an embodiment of the present invention wherein a delimiter comprises a either a multi-cycle waveform or a pulse doublet 300, such as that shown in FIG. 10. The circuitry 50 comprises a number of components, which define a receiver 50b path and a transmitter 50a path, a number of components being shared between these paths.

Turning first to the transmitter 50a path of the TX/RX circuitry 50, a differential amplifier 164 is shown to receive either a multi-cycle waveform or a pulse doublet from a pulse generator in the form of a square wave. This square wave is passed through the differential amplifier 164 to a bandpass filter 162. The bandpass filter 162 outputs a multi-cycle waveform or a pulse doublet 300, for example, corresponding to that shown in FIG. 10. The output of the bandpass filter 162 is propagated through a socket 160 to a POTS wiring network 25.

The receiver 50b path of the circuitry 50 performs the following functions to decode a received waveform:

1. Rejects noise pulses.
2. Rejects decaying signal remnants of current or previous pulses.
3. Selects a distinctive feature of the waveform for timing measurement.
4. Measures the time delay from the previous pulse.
5. Increases noise rejection during data symbol intervals.

By designing the electrical characteristics of the receiver 50b path to band limit the incoming waveform to between 50 kHz and 4 MHz, band noise and harmonic power may be effectively rejected. The receiver 50b path is shown to comprise part of the Analog Front End (AFE) 50a, which includes a socket 160 for receiving a jack coupling the receiver 50b path to the POTS wiring network 25. In the embodiment in which the delimiter comprises a multi-cycle waveform, such as for example that shown in FIG. 14, a received multi-cycle waveform is propagated from the socket 160 to the bandpass filter 162 that limits the bandwidth of the received signal to between 5.5 and 9.5 MHz. In an alternative embodiment, in which the delimiter comprises a pulse doublet, a received pulse doublet signal is propagated from the socket 160 to the bandpass filter 162 that limits the bandwidth of the received signal to between 50 kHz and 4 MHz. An exemplary spectral mask for this embodiment is shown in FIG. 12.

For a "multi-cycle waveform" embodiment, the filtered signal is then propagated from the bandpass filter 162 to the differential amplifier 164, and then onto an envelope detector 166 that outputs the envelope signal 142 illustrated in FIG. 14. In a "pulse doublet" embodiment, it will be appreciated that an envelope detector may not be required and thus may be omitted from the receive path 50b.

The envelope signal 142, in one embodiment, is then fed through a unipolar operational amplifier (opamp) 168, from where it is delivered to pulse detector logic 170, which is illustrated to send and receive signals from "squelch" or threshold logic 172. Specifically, the threshold logic 172 propagates analog signals to the pulse detector logic 170 that indicates the noise threshold level 144, the data threshold level 136, and the peak threshold level 148. The pulse detector logic 170 then outputs a sequence of digital pulses to the decoder 46b, this sequence of digital pulses encoding both the access identifiers and data.

Figure 16:
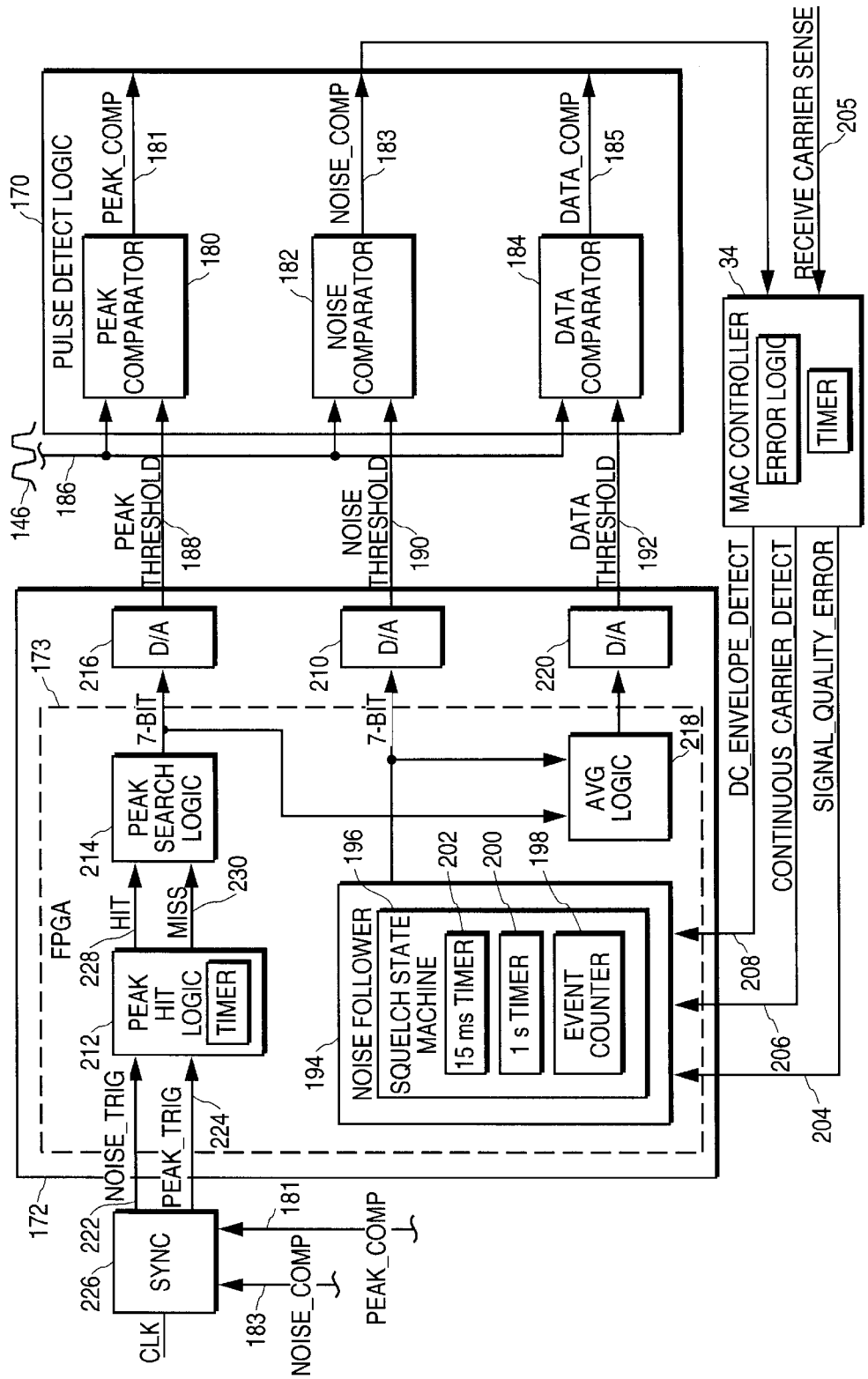
FIG. 16 is a block diagram illustrating further details regarding pulse detector logic and threshold logic, according to an exemplary embodiment of the present invention, that may be included within the receiver illustrated in FIG. 15.

FIG. 16 is a block diagram providing further detail regarding the pulse detector logic 170 and the threshold logic 172, according to an exemplary embodiment after the present invention. The threshold logic 172 may be implemented utilizing a Field Programmable Gate Array (FPGA) 173, an ACIC or discrete logic components. It will however be appreciated that, in alternative embodiments, the functionality described below could be implemented in hardware, software, or any combination thereof. In the case where any of the functionality and logic required to implement the invention as described below is implemented in software, the sequence of instructions embodying the functionality, and that are executed by a machine (e.g., a general purpose microprocessor or microcontroller), may be stored utilizing any machine-readable medium that is accessible by the machine. Accordingly, for the purposes of the present specification, the term "machine-readable medium" shall be taken to include, but not be limited to, solid-state memories, magnetic memories, optical memories, and carrier wave signals.

The pulse detector logic 170 is shown to include three comparators, namely a peak comparator 180, a noise comparator 182 and a data comparator 184. Each comparator is illustrated as receiving two inputs, namely the amplified envelope signal 142 on line 186 and a respective threshold level from the threshold logic 172. The peak comparator 180 is shown to receive the peak threshold level 148 on line 188, the noise comparator 182 is shown to receive the noise threshold level 144 on line 190, and the data comparator 184 is shown to receive the data threshold level 146 on line 192. Each of the comparators compares the amplified envelope signal 142 to a respective threshold level, and outputs a square pulse on the detection of a transcendence, or traversal, of the respective threshold level by the amplified envelope signal 142. Specifically, the peak comparator 180 outputs a peak comparator signal 181, the noise comparator 182 outputs a noise comparator signal 183, and the data comparator 184 outputs a data comparator signal 185, each of these signals comprising a sequence of spaced pulses in the form of square waves.

The threshold logic 172 includes a noise follower 194 that implements a "squelch" state machine 196 that is further shown to include an event counter 198, a one (1) second timer 200 and a fifteen (15) millisecond timer 202. The timers 200 and 202 may be implemented utilizing a single timer in conjunction with a chain of dividers, and the noise follower 194 may accordingly include any number of timers. The noise follower 194 receives three primary inputs, namely a signal quality error signal 204, a continuous carrier detect signal 206 and a DC envelope detect signal 208. Both the signal quality error signal 204 and the DC envelope detect signal 208 are, in one exemplary embodiment, fed back to the noise follower 194 from a MAC controller 34, which is shown to receive the noise comparator signal 183 as an input. The noise comparator signal 183 is utilized by the MAC controller 34 to generate the signal quality error signal 204, and also to decode and determine an access identifier of a remote, transmitting node for the purposes of collision detection. The MAC controller 34 is also shown to receive a receive carrier sense signal 205, which is utilized in the manner described below to generate the continuous carrier detect signal 206. The utilization of each of the signals by the noise follower 194 will be described in further detail below. The noise follower 194 furthermore outputs seven-bit sequences, indicative of the noise threshold level 144, to a digital-to-analog converter 210, that outputs the noise threshold level 144 as an analog signal.

The threshold logic 172 further includes peak hit logic 212 and peak search logic 214. The peak hit logic 212 is coupled to receive a noise trigger signal 222 and a peak trigger signal 224 from synchronization circuitry 226 that generates the trigger signals 222 and 224 as rising edge synchronized derivatives of the noise comparator and peak comparator signals 183 and 181. The peak hit logic 212 outputs respective hit and miss signals 228 and 230 to the peak search logic 214. The peak search logic 214 in turn propagates seven-bit sequences to a digital-to-analog converter 216, which outputs an analog signal comprising the peak threshold level 148.

Finally, averaging logic 218 receives the seven-bit sequences outputted from the noise follower 194 and the peak search logic 214, and performs an averaging operation on these outputs to generate a unique seven-bit sequence output that is similarly propagated to a further digital-to-analog converter 220, the outputs of the converter 220 comprising the data threshold level 146.

Noise Threshold Level Algorithm/State Machine

Figure 17:
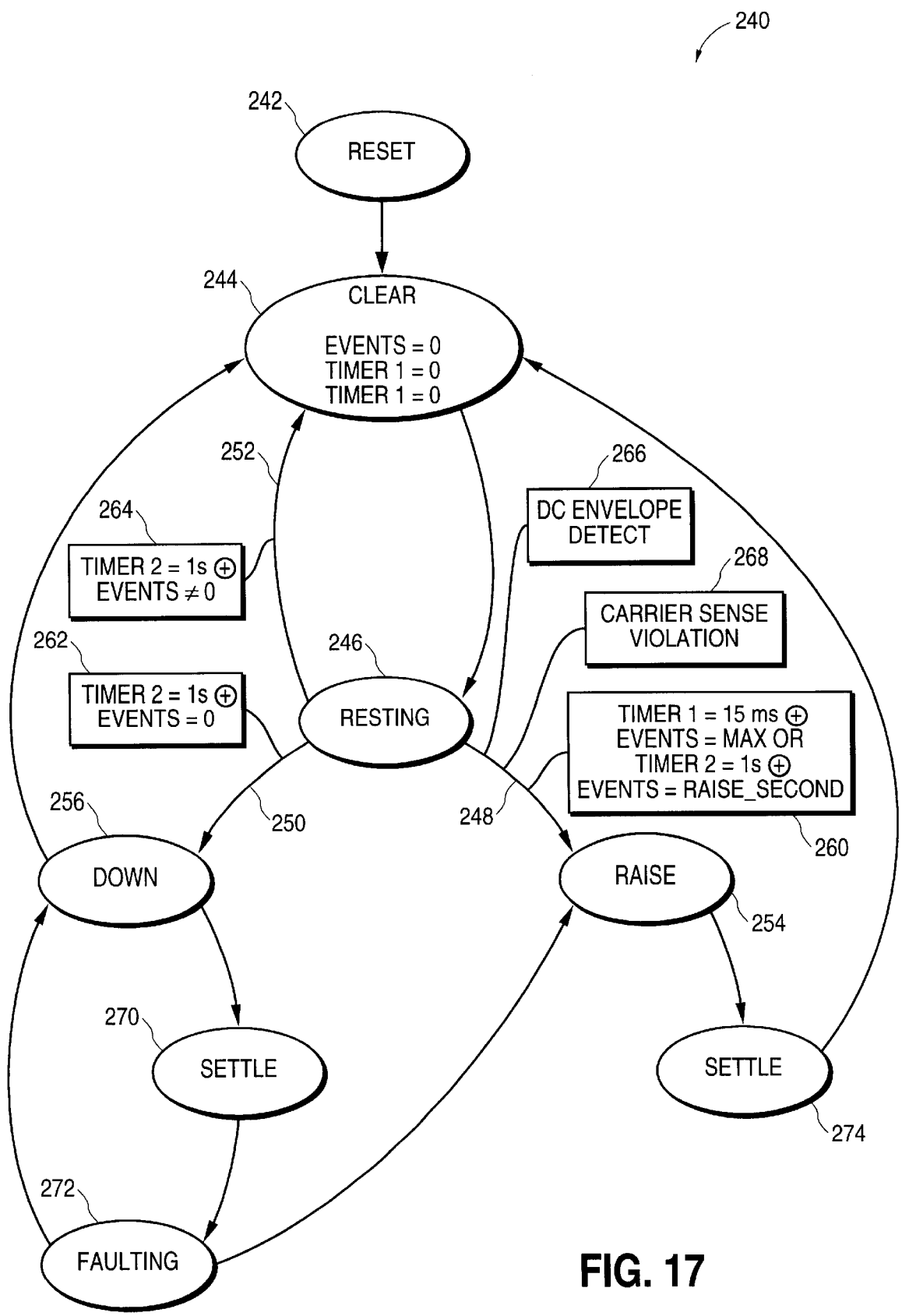
FIG. 17 is a state diagram illustrating a state set for a "squelch" state machine that may be implemented within a noise follower circuit, as illustrated in FIG. 16, according to an exemplary embodiment.

FIG. 17 is a state diagram illustrating a state set 240 for the "squelch" state machine 196, according to an exemplary embodiment of the present invention. From a reset state 242, the state machine 196 enters a clear state 244, wherein the event counter 198, the fifteen millisecond timer 202 (i.e., timer 1) and the one second timer 200 (i.e., timer 2) are all cleared to zero (0). From the clear state 244, the state machine 196 automatically progresses to the resting state 246, where the state machine 196 resides until one of a number of events occur to indicate that the noise threshold level 144 needs to be raised or lowered. Specifically, the state machine 196 may progress to a raise state 254, as indicated by arrow 248, to a down state 256, as indicated by arrow 250, or back to the clear state 244, as indicated by the arrow 252. The transitions from the resting state 246 are furthermore prioritized, with the transition to the raise state 254 having a highest priority, the transition to the down state 256 having an intermediate priority, and the transition to the clear state 244 having a lowest priority. A number of transition events determine to which state the state machine 196 transitions from the resting state 246, these transition events being indicated in respective blocks 260–268 shown connected to the various transition arrows 248, 250 and 252.

Figure 18:
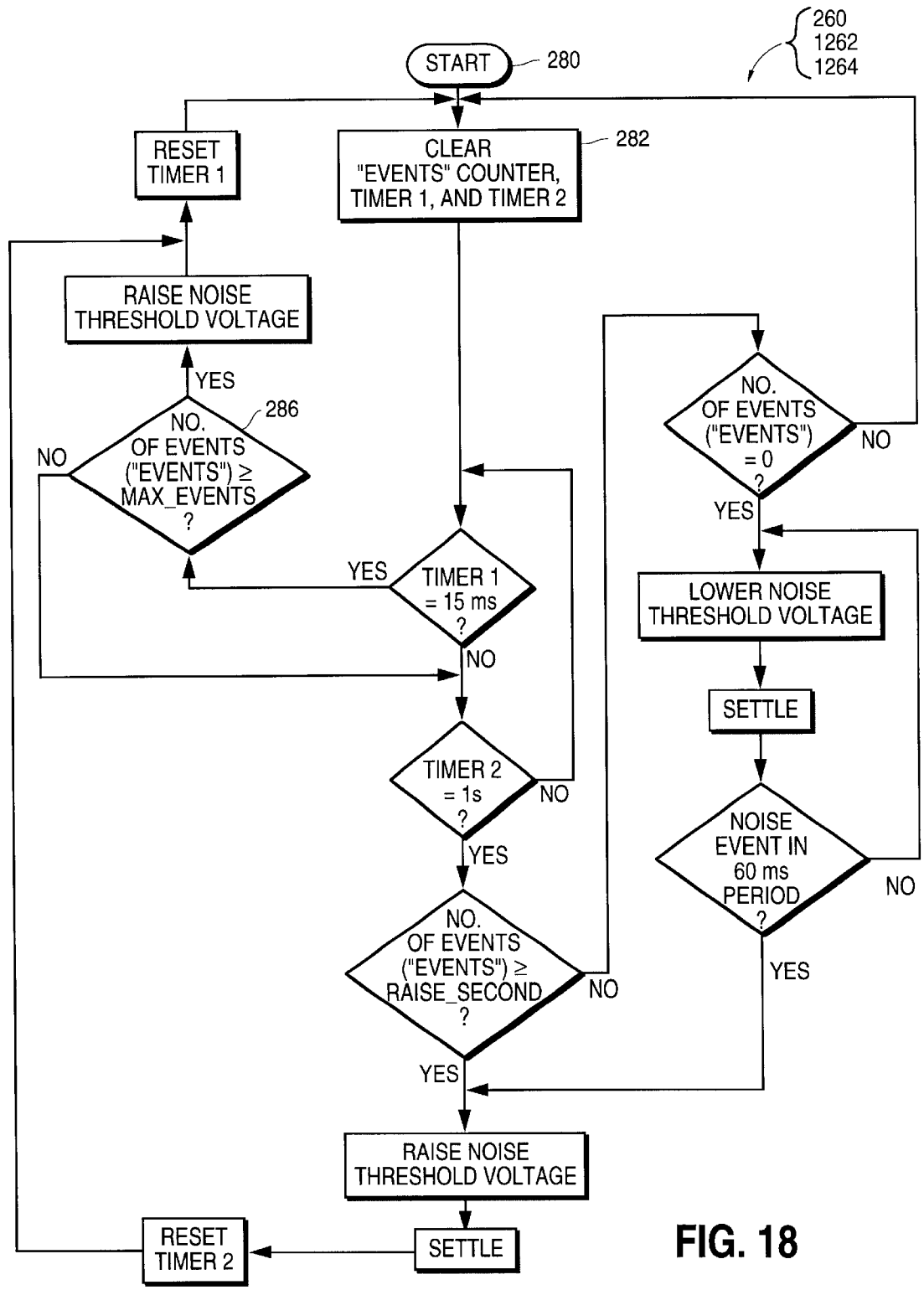
FIG. 18 is a flowchart illustrating a method, according to an exemplary embodiment, of dynamically varying the noise sensitivity of a receiver.

Dealing first with the transition events 260, 266 and 268 that trigger a transition 248 from the resting state 246 to the raise state 254, an exemplary embodiment after the transition event 260 is illustrated in the flowchart shown in FIG. 18. Specifically, the transition event 260 commences at step 280, and proceeds to step 282, wherein the event counter 198, and the timers 200 and 202 are each cleared, this step being performed in the clear state 244 shown in FIG. 17. At decision box 284, a determination is made as to whether the timer 202 has recorded the expiration of fifteen milliseconds. If so, a determination is then made at decision box 286 as to whether a number of noise events, as counted by the event counter 198, exceeds a predetermined maximum number ($MAX_{13}EVENTS$) of noise events. In one exemplary embodiment, the predetermined maximum number ($MAX_{13}EVENTS$) is equal to fifteen (15) noise events. In this regard, the event counter 198 is increment by, inter alia, each assertion of the signal quality error signal 204 by the MAC controller 34.

Figure 19:
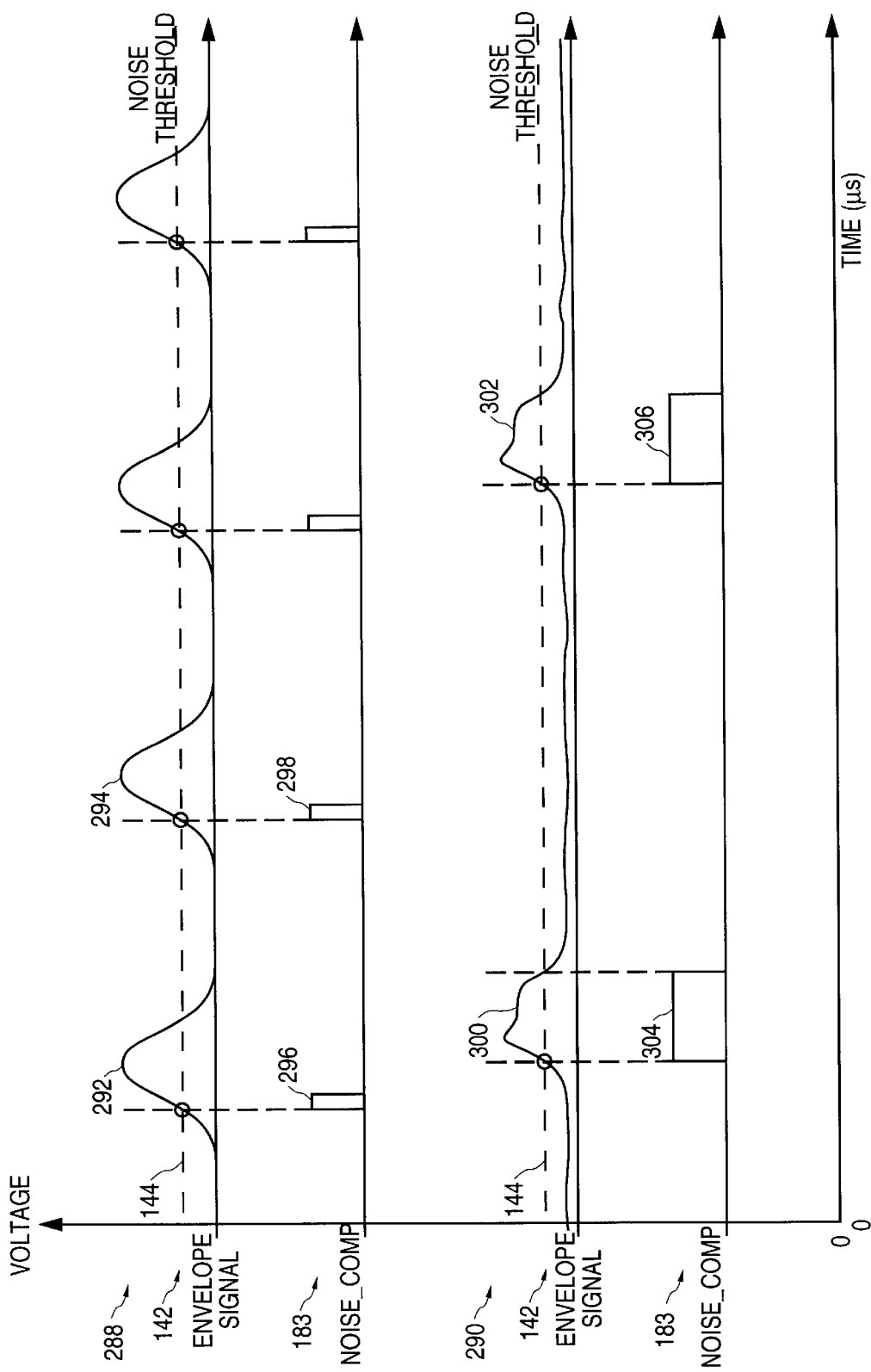
FIG. 19 is a timing diagram illustrating an exemplary envelope signal and an exemplary noise comparator signal in two scenarios.

The MAC controller 34 is shown to receive the noise comparator signal 183, which is utilized by error logic 33 and a timer 37 within the MAC controller 34 to generate the signal quality error signal 204. The generation of the signal quality error signal 204 by the error logic 33 will now briefly be described with reference to FIG. 19. FIG. 19 is a timing diagram showing an exemplary envelope signal 142 and a noise comparator signal 183 for two scenarios. Specifically, FIG. 19 illustrates a first scenario 288 in which a noise event will not be registered by the error logic 33, and a second scenario 290 in which a noise event will be registered by the error logic 33. As described above with reference to FIG. 8, the header portion 100 of a frame 99 includes a synchronization interval 101 defined by two pulses that are spaced by a fixed and predetermined time interval. In the first illustrated scenario 288, an envelope signal 142 derived from a received header portion 100 is shown to include a first pair of pulses 292 and 294 that define the synchronization interval 101 of the header portion 100. The traversal of a noise threshold level 144 is detected by the noise comparator 182, which is then shown to generate a noise comparator signal 183, including pulses 296 and 298, in response to the respective traversals of the noise threshold level 144 by the pulses 292 and 294. The noise comparator signal 183 is then propagated to the MAC controller 34, which measures the time interval between the reception of the pulses 296 and 298 utilizing the timer 37. The error logic 33 then makes a determination as to whether the measured time interval between the arrival of the pulses 296 and 298 corresponds to a synchronization interval and if so, registers the beginning of a packet reception. This is the case for the pulses 296 and 298. The second scenario 290 illustrates a situation in which two noise pulses 300 and 302 are included within an envelope signal 142, and similarly traverse the noise threshold level 144 to generate noise comparator signal pulses 304 and 306. In this case, the error logic 33 will detect the absence of a second pulse at a predetermined synchronization interval after the detection of the pulse 304, recognize the pulse 304 as corresponding to a noise event and then assert the signal quality error signal 204 responsive to the detection of the absence of the second pulse. It will be appreciated that, in a third scenario (not illustrated), should a noise pulse cause a noise comparator signal pulse to be generated prior to the expiration of the predetermined synchronization interval, the error logic 33 will similarly recognize the premature noise comparator signal pulse as indicating a noise event, responsive to which the error logic 33 will then assert the signal quality error signal 204.

Returning now to the flowchart shown in FIG. 18 and the state diagram shown in FIG. 17, should it be determined at decision box 286 that the number of noise events counted by the event counter 198 within a fifteen millisecond time interval does exceed the predetermined maximum number of events ($MAX_{13}EVENTS$), the noise threshold level 144 is raised at step 308 by transitioning the state machine 196 into the raise state 254. Prior to raising the noise threshold level 144, the state machine 196 determines that a noise ceiling will not be exceeded by the adjusted noise threshold level 144. The raising of the noise threshold level 144 is achieved by incrementing the seven-bit output of the noise follower 194 by a predetermined amount. For example, the seven-bit output of the noise follower 194 may be incremented to achieve a 10 m V increase in the output of the digital-to-analog converter 210. Following the raising of the noise threshold level 144 at step 308, the new threshold level 144 is given the opportunity to settle at step 310. The settling interval is implemented so as to allow the increase in the threshold level 144 to be propagated from the noise follower 194, through the digital-to-analog converter 210, and then to stabilize on the line 190. In one exemplary embodiment, the settling interval may be between 15–20 milliseconds. From step 310, the event counter 198 and the timers 200 and 202 are again reset and cleared at step 282.

Returning to decision boxes 286 and 284, if it is determined at decision box 284 that the timer 202 has not registered fifteen milliseconds, or if it is determined at decision box 286 that the number of noise events counted by the event counter 198 does not exceed the predetermined maximum number of events, a determination is then made at decision box 311 whether the timer 200 has registered a one second time period. If not, a return is made to decision box 284. Alternatively, should the timer 200 register a one second interval, a further determination is made at decision box 312 whether the number of noise events registered by the event counter 918 is greater than, or equal to, a further predetermined number of noise events ($RAISE_{13}SECOND$). In one exemplary embodiment, the further predetermined number of noise events ($RAISE_{13}SECOND$) is four (4) noise events. If so, the noise threshold level 144 is raised at step 314, in the manner described above, whereafter the newly adjusted noise threshold level 144 is allowed to settle at step 310. The methodology discussed with respect to FIG. 18 thus far represents exemplary transition event 260.

Turning now to the transition event 262 that triggers the transition 250 from the resting state 246 to the down state 256, should it be determined at decision box 312 that the number of events registered by the event counter 198 is not greater than, or equal to, the further predetermined maximum number of noise events ($RAISE_{13}SECOND$), a further determination is then made at decision box 316 as to whether the number of noise events registered by the event counter 198 is equal to zero. If so, the state machine 196 then transitions from the resting state 246 to the down state 256, and the noise threshold level 144 is lowered at step 318 (e.g., by 10 m V) by decrementing the seven-bit output of the noise follower 194. The state machine 196 then transitions to the settle state 270, where the adjusted noise threshold level 144 is afforded the opportunity to settle at step 320.

From the settle state 270, the state machine 196 transitions to the falling state 272 where a further determination is made at decision box 322 whether a further noise event is detected within a predetermined time interval. In one exemplary embodiment, a determination may be made as to whether a further noise event, represented by an assertion of the signal quality error signal 204, is detected within a 60 millisecond time interval. If no further noise event is detected, then the state machine 196 returns to the down state 256, where the noise threshold level 144 is again lowered by the predetermined increment. The falling state 272 allows the state machine 196 rapidly to decrease or "decay" the noise threshold level 144 (and accordingly increase the sensitivity of the receiver 50b) in the absence of any noise on the carrier medium. On the other hand, when in the falling state 272, should a noise event be detected within the 60 millisecond time interval at decision box 322, the state machine 196 transitions directly to the raise state 254 where the noise threshold level 144 is raise at step 314 in the manner described above.

Turning now finally to the transition event 264 that triggers the transition from the resting state 246 to the clear state 244, if it is determined at decision box 316, as illustrated in FIG. 18, that the number of noise events registered by the event counter 198 is not equal to zero (e.g., the number of noise events registered by the event counter 198 is either 1,2 or 3) then the state machine 196 transitions from the resting state 246 to the clear state 244. In the clear state 244, the event counter 198, and timers 200 and 202, are reset and cleared at step 282. Accordingly, the state machine 196, by implementing the state set 240, seeks to maintain the noise threshold level 124 as a level at which between zero and three noise events are detected and registered per second.

It will also be noted that by comparing the number of noise events within a relatively short time interval (e.g., fifteen milliseconds) to a relatively large number of noise events ($MAX_{13}EVENTS$), and raising the threshold level if the number of noise events within this short time interval exceeds the larger number of noise events, an accelerated increase in the noise threshold level 144 may be achieved in the event that a high occurrence of noise is present. In the event that less noise is present on the carrier medium, the rate at which the threshold level 144 is raised is slower, in that the threshold level 144 will only be raised if a relatively small number of noise events ($RAISE_{13}SECOND$) are detected within a relatively long time interval (e.g., one second).

Figure 20:
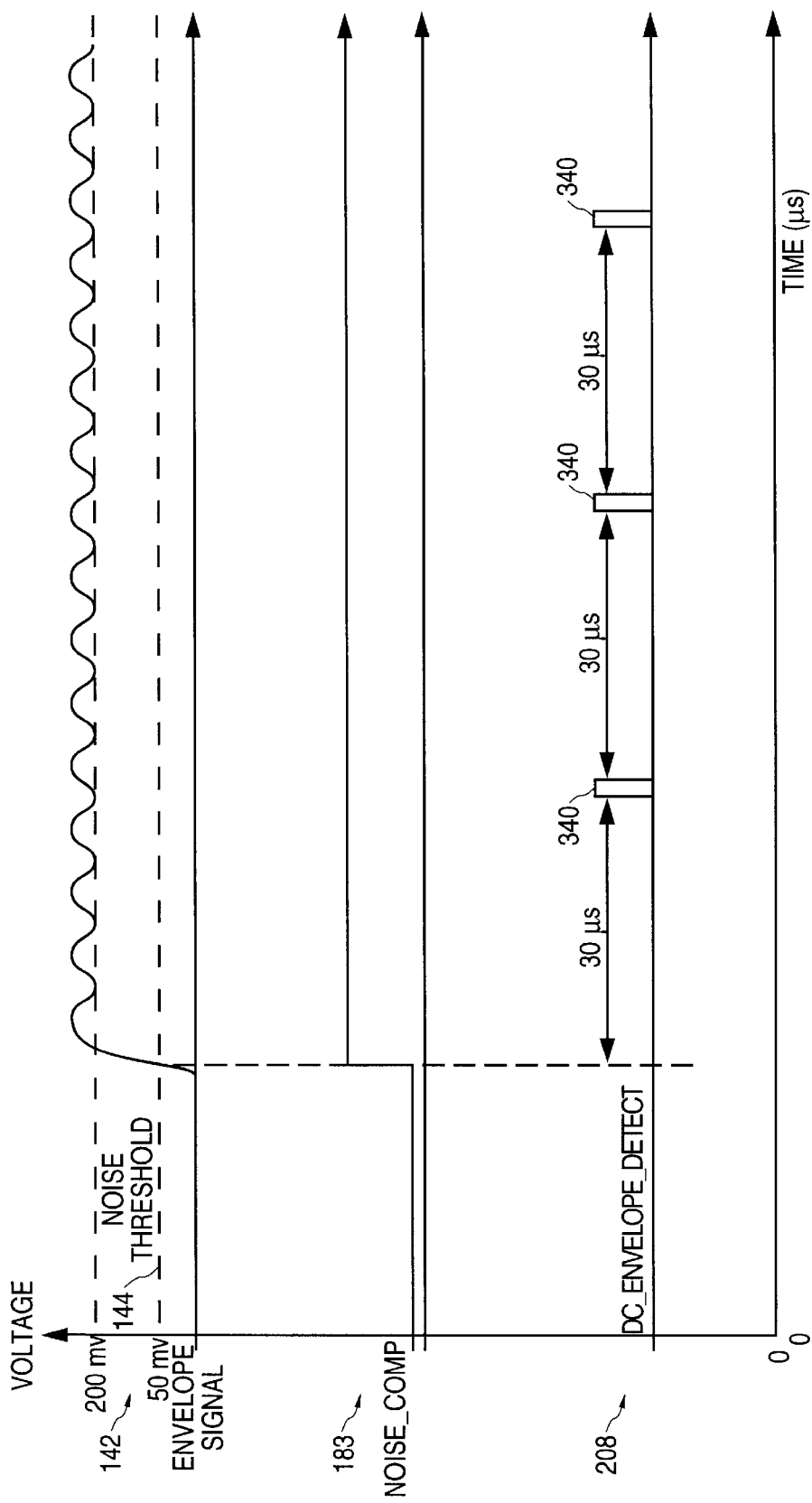
FIG. 20 is a timing diagram illustrating an exemplary envelope signal, noise comparator signal and D.C. envelope detect signal.

The transition event 266, that may conveniently be termed a DC envelope detect transition, will now be described with reference to FIG. 20. FIG. 20 illustrates three exemplary signals, namely the envelope signal 142, the noise comparator signal 183 and the DC envelope detect signal 208. In the event that a DC signal is generated on the carrier medium, for example by an AM radio carrier signal or the like, an envelope signal 142 as illustrated in FIG. 20 may be inputted to the noise comparator 182. In this case, as the envelope signal 142 traverses the noise threshold level 144 in a rising direction, but may then maintain a roughly constant level (e.g., approximately 200 m V) and may not again fall below the noise threshold level 144. In this case, the output of the noise comparator 182 (i.e., the noise comparator signal 183) will not be de-asserted. As the MAC controller 34, and the error logic 33, detect signal quality errors responsive to the rising edge of the noise comparator signal 183, an observation of the signal quality error signal 204 will not indicate the presence of any noise events on the carrier medium. Accordingly, the state machine 196 will view the carrier medium as being quiet, and maintain the noise threshold level 144 at a current level (e.g., 50 m V), well below the noise floor (e.g., 200 m V) of the DC envelope signal 142. To address the above described limitation, the present invention proposes that the timer 37 time the interval for which the noise comparator signal 183 is asserted, and that the error logic 33 generate the DC envelope detect signal 208 pulse at predetermined time intervals during the assertion of the noise comparator signal 183. In one exemplary embodiment, the error logic 33 may output a pulse, as illustrated at 340, after each 30 millisecond time interval for which the noise comparator signal 183 is asserted. The event counter 198 is incremented by each pulse of the DC envelope detect signal 208, in the same way that it is incremented by a pulse of the signal quality error signal 204. Accordingly, each 30 millisecond time interval for which the noise comparator signal 183 is asserted is viewed as a noise event. Should the noise comparator signal 183 remain asserted as a result of a DC envelope signal 142, the event counter 198 will be incremented at regular intervals (e.g., 30 milliseconds), thus resulting in the noise threshold level 144 being raised until it exceeds the noise floor presented by the DC signal, at which stage the noise comparator signal 183 will be de-asserted.

Figure 21:
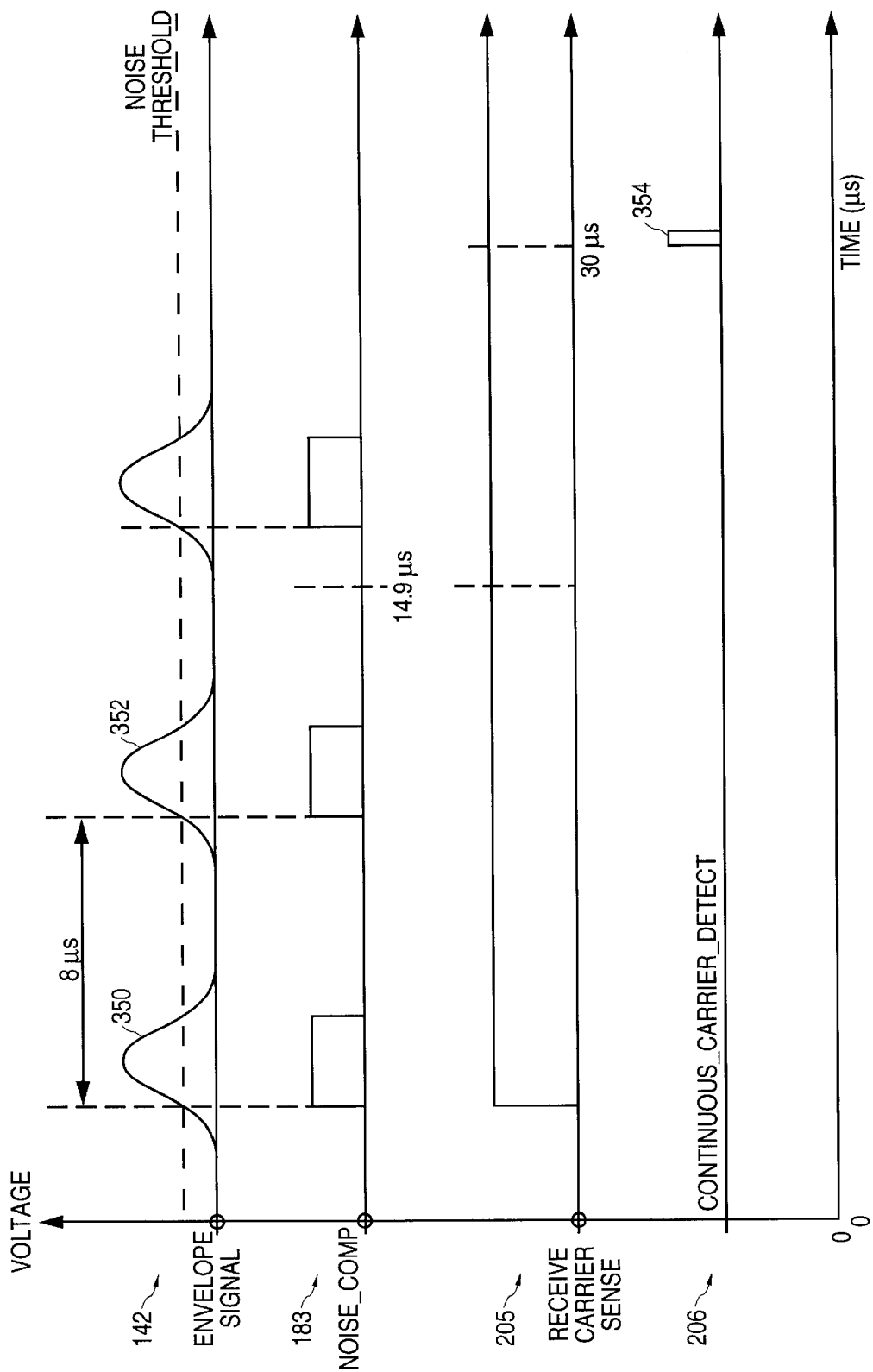
FIG. 21 is a timing diagram illustrating an exemplary envelope signal, noise comparator signal, receive carrier sense signal, and continuous carrier detect signal, as generated according to one embodiment of the present invention.

The transition event 268, which may conveniently be termed a carrier sense violation transition, will now be described with reference to FIG. 21. FIG. 21 again illustrates an exemplary envelope signal 142, an exemplary noise comparator signal 183, a receive carrier sense signal 205, and a continuous carrier detect signal 206. The exemplary envelope signal 142 is shown to comprise unipolar pulses 350 and 352 that are relatively close together (e.g., spaced by less than 8 microseconds). Such closely spaced pulses may result from interference generated by, for example, a DC motor. As described above with reference to FIG. 19, the synchronization interval 101 allows the MAC controller 34 to detect the beginning of a frame transmission if first and second pulses are spaced by a predetermined interval (e.g., 14.9 microseconds). In the absence of a second pulse at the 14.9 microsecond location after the detection of a first pulse, a noise event is registered. However, should a further noise pulse, such as that illustrated at 352, be received prior to the 14.9 microsecond location, the receive carrier sense signal 205 may not turn off as a result of the continually received signals. As shown in FIG. 16, the receive carrier sense signal 205 is provided to the MAC controller 34, where the timer 37 times an interval for which the receive carrier sense signal 205 is asserted. In the event that the receive carrier sense signal 205 remains asserted for greater than a predetermined time (e.g., 30 microseconds), the continuous carrier detect signal 206 is asserted by the error logic 33 to generate a pulse 354. On detecting the pulse 354 of the continuous carrier detect signal 206, the state machine 196 will then transition from the resting state 246 to the raise state 254, where the noise threshold level 144 will be raised in the manner described above with reference to FIG. 18. Accordingly, the transition event 268 differs from the transition events 260 and 266 in that such an event does not increment the event counter 198, but causes the state machine 196 to transition immediately from the resting state 246 to the raise state 254.

Figure 22:
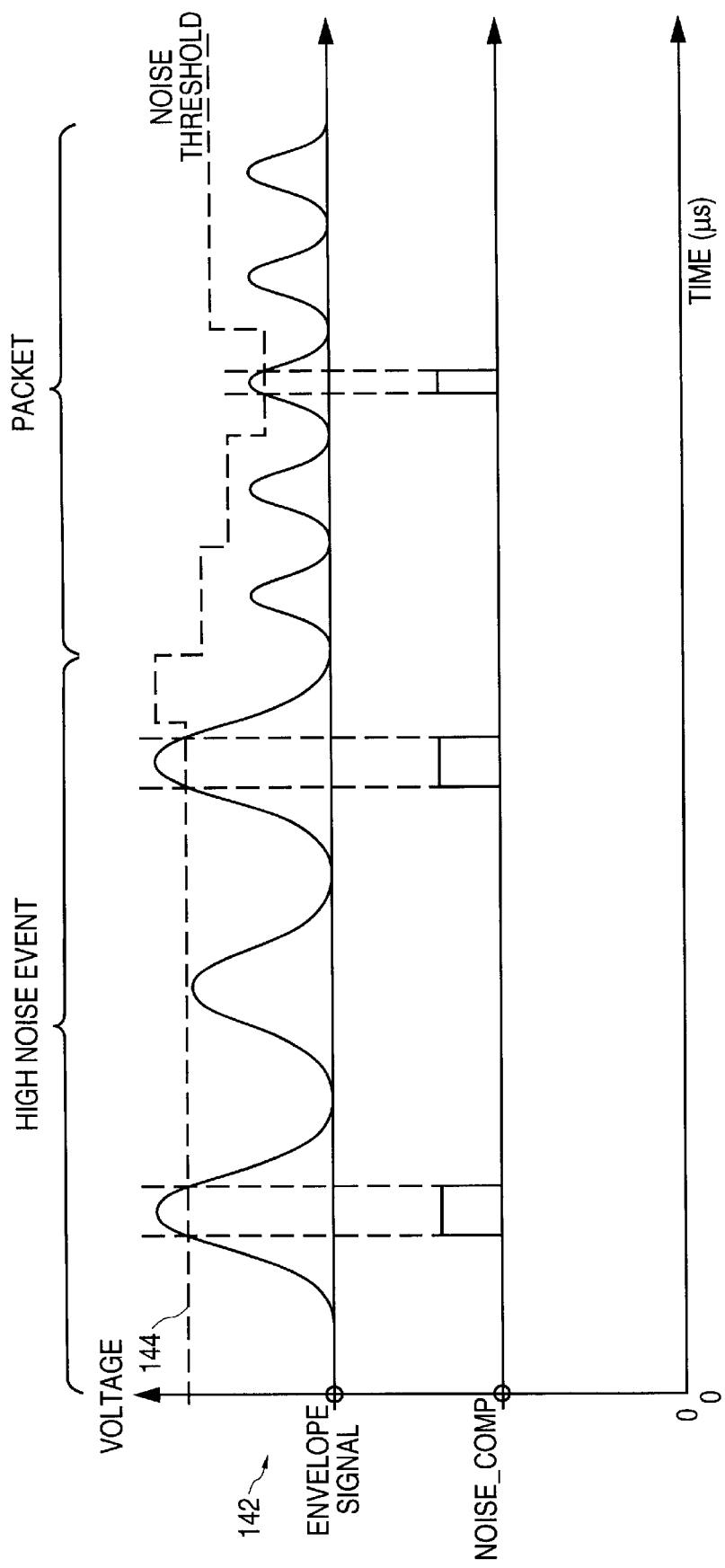
FIG. 22 is a timing diagram illustrating an exemplary envelope signal and an exemplary noise comparative signal that illustrate a problem which may occur when a high noise event is followed by a packet transmission having a low signal amplitude.

A further embodiment of the present invention will now be described with reference to the timing diagram shown in FIG. 22. A situation may occur in which a time interval of high noise levels is proceeded by a data transmission for which the signal amplitudes are relatively small relative to the amplitudes of the preceding noise signal. FIG. 22 illustrates such a situation wherein an envelope signal 142 comprises a sequence of large amplitude pulses (i.e., a high noise event) followed by a sequence of low amplitude pulses that constitutes a valid data transmission. A dynamically varying noise threshold level 124 is also shown to follow the noise floor, for example by the methodologies discussed above, following the ending of the high noise event. However, it may occur that the noise threshold level 144 drops to a level at which the data transmission is detected sometime after the actual beginning of the transmission of the data packet. In other words, the noise threshold level 144 drops into the middle of a data transmission. In such a case, a pulse of the envelope signal 142 representing the data transmission may be recognized by the error logic 33 within the MAC controller 34 as a noise event in view of the MAC controller's ignorance regarding the preceding pulses of the data transmission. This may in turn result in the noise threshold level 144 being raised again, as illustrated in FIG. 22, to a level above which the pulses of the data transmission are detected. With a view to preventing the occurrence of such an event, one embodiment of the present invention proposes that the signal quality error signal 204 only be asserted if a noise event is detected, and the receive carrier sense signal 205 has not been asserted for longer than a predetermined interval (e.g., 300 microseconds). Specifically, if the receive carrier sense signal 205 has been asserted for greater than the predetermined time interval, then a pulse of the noise comparator signal 183, that would otherwise have generated a pulse of the signal quality error signal 204, is not viewed as indicating a noise event. If the receive carrier sense signal 205 has been asserted for greater than 300 microseconds, this indicates that a packet may be in the process of being received, and the noise threshold level 144 will not be raised. It will also be appreciated that, in the event that the lower amplitude signal is in fact noise, the receive carrier sense signal 205 may remain asserted for longer than the 30 millisecond time interval specified above, in which case the continuous carrier detect signal 206 will be asserted to raise the noise threshold level 144.

Peak Threshold Level Algorithm

Figure 23:
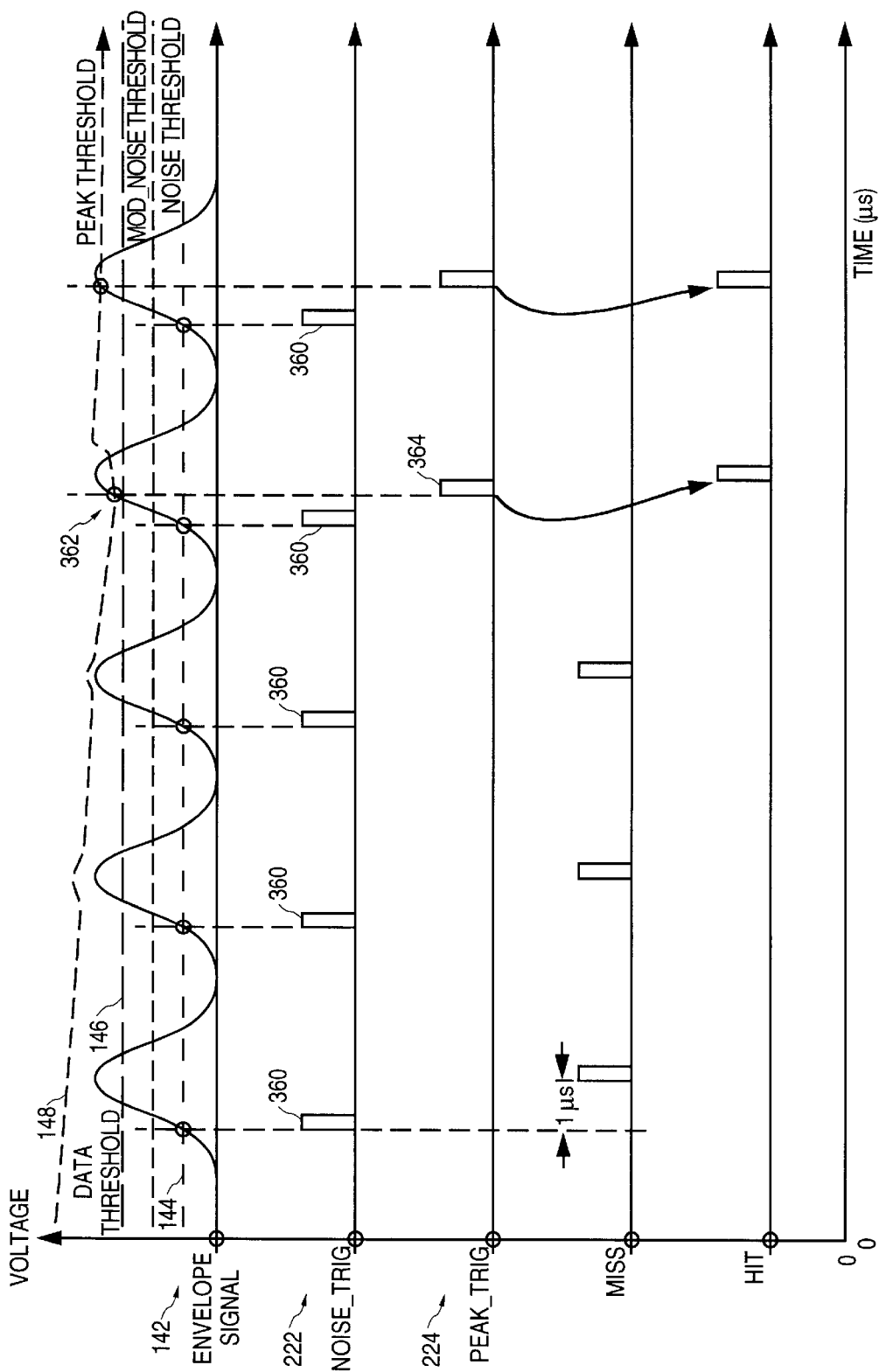
FIG. 23 is a timing diagram illustrating an exemplary envelope signal, noise trigger signal, peak trigger signal, miss signal, and hit signal.

A peak threshold level determination algorithm will now be described with reference to FIGS. 16, 23, 24 and 25. FIG. 23 is a timing diagram illustrating exemplary signals that may be generated within the receiver 50b, shown in FIG. 15. Specifically, FIG. 23 illustrates an envelope signal 142, over which a noise threshold level 144, a data threshold level 146 and a peak threshold level 148 have been superimposed. The peak threshold level 148 is set to an initial high value, and is then shown to incrementally descend until traversed by the envelope signal 142, after which it stabilizes at a level approximate with the peak level of the envelope signal 142. The methodology by which the peak threshold level 148 is lowered as shown in FIG. 23 will be described below. FIG. 23 also illustrates an exemplary noise trigger signal 222 and an exemplary peak trigger signal 224. The signals 222 and 224 are clock synchronized derivatives of the noise comparator signal 183 and the peak comparator signal 181, and are generated by the synchronization circuitry 226, as illustrated in FIG. 16 For the purposes of explanation, the noise trigger signal 222 and the peak trigger signal 224 are shown to be derived directly from the envelope signal 122. However, as a result of the synchronization, it will be appreciated that the signals 222 and 226 are not aligned with transitions of the threshold levels, as shown in FIG. 23. As stated above, the peak threshold level 148 may be set to an initial high level, at which it is not traversed by the envelope signal 142. In this case, the peak comparator signal 181 will not be asserted. However, it will be appreciated that the noise, threshold level 144 is traversed by each pulse of the envelope signal 142, and will accordingly generate a series of pulses 360 of the noise trigger signal 222, as illustrated. It will also be appreciated that, when the peak threshold level 148 eventually descends below the peak value of a pulse of the envelope signal 142, as illustrated at 362, the envelope signal pulse will traverse the peak threshold level 148 at a time period slightly after the same pulse has traversed the noise threshold level 144, as a result of the slope of the rising edge of the pulse. The traversal of the peak threshold level 148 by an envelope signal pulse causes a pulse 364 of the peak trigger signal 224 to be generated, this pulse 364 being slightly delayed relative to a corresponding pulse 360 of the noise trigger signal 222. The present invention proposes utilizing this information to raise and lower the peak threshold level 148.

Figure 24:
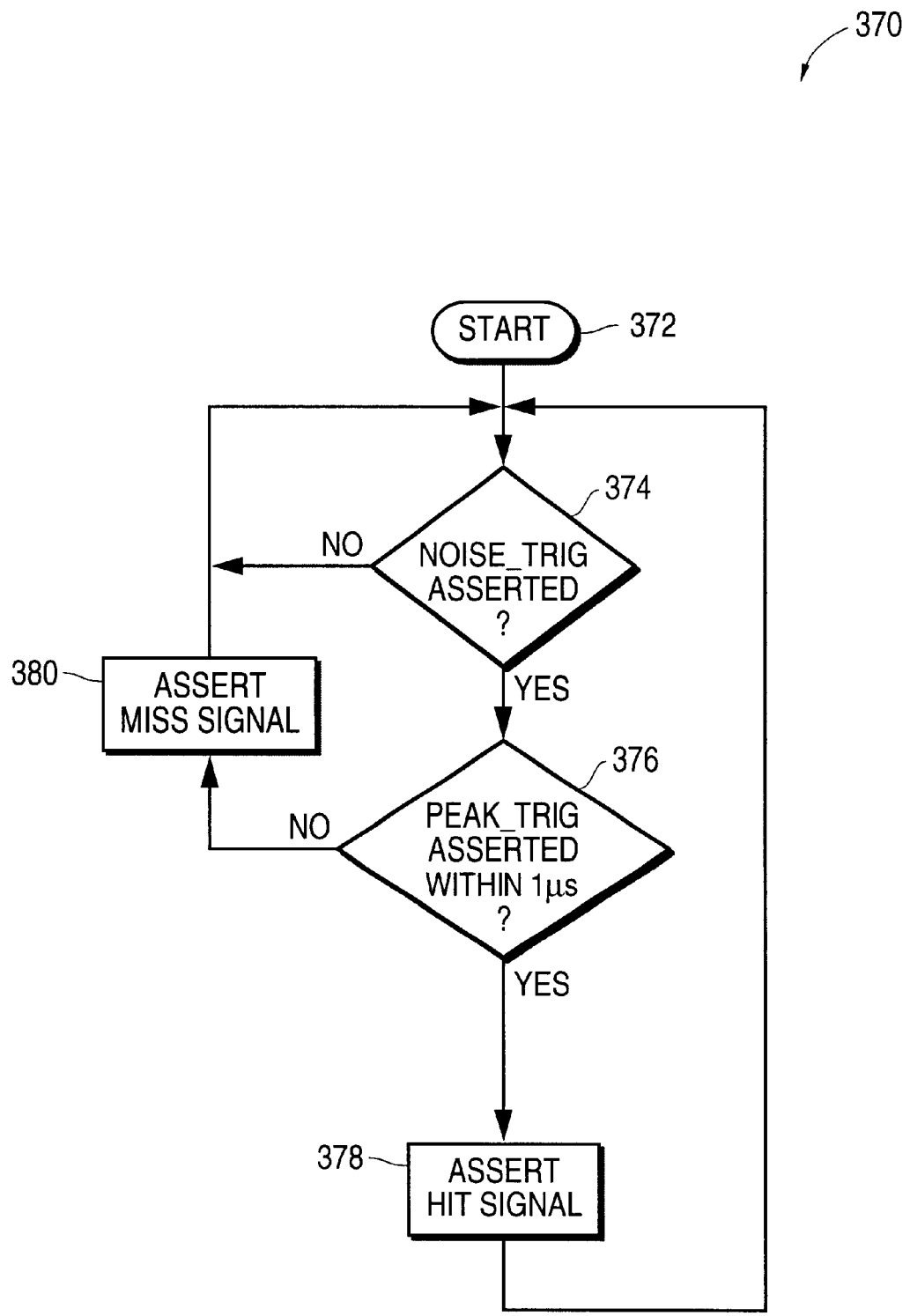
FIG. 24 is a flowchart illustrating a method, according to an exemplary embodiment, of raising and lowering a peak threshold level.

Referring now specifically to FIG. 24, there is shown a flowchart illustrating a method 370, according to an exemplary embodiment of the present invention, of raising and lowering the peak threshold level 148. The method 370 commences at step 372, and then proceeds to step 374, where a determination is made by the peak hit logic 212 as to whether the noise trigger signal 222 has been asserted, as a result of a corresponding assertion of the noise comparator signal 183. If not, the method 370 loops in this state until a noise trigger signal assertion is detected. Following the detection of such an assertion, a determination is made by the peak hit logic 212 at decision box 376 regarding whether an assertion of the peak trigger signal 224 occurs within a predetermined time interval (e.g., a one microsecond). To this end, the peak hit logic 212 includes a timer for tracking the time interval following the detected assertion of the noise trigger signal 222. If an assertion of the peak trigger signal 224 is detected within the predetermined time interval, the hit signal 228 is asserted at step 378. Alternatively, if no assertion of the peak trigger signal 224 is detected within the predetermined time interval, the miss signal 230 is asserted at step 380. The method 370 then loops back to decision box 374.

Figure 25:
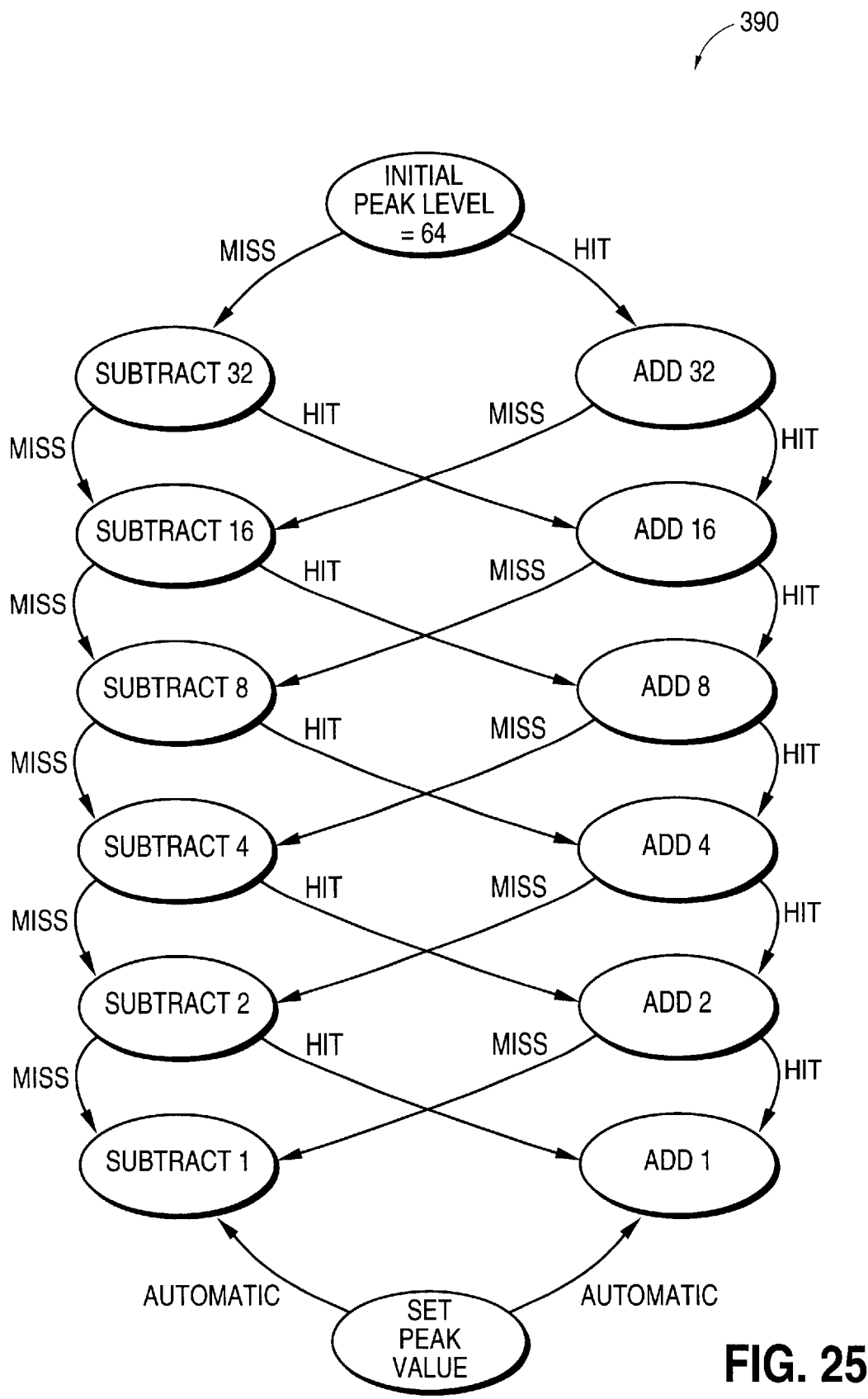
FIG. 25 is a state diagram illustrating a state set, according to one exemplary embodiment, that describes how peak search logic modifies an initial peak threshold value as a result of the assertion of the hit and miss signals illustrated in FIG. 23.

FIG. 25 is a state diagram showing a state set 390, according to one exemplary embodiment of the present invention, that describes how the peak search logic 214 modifies an initial peak threshold value, represented by a seven-bit sequence, as a result of the assertion of the hit or miss signals 228 or 230 by the peak hit logic 212. Specifically, the peak search logic 214 is shown to reside in an initial idle state, whereafter sequentially decreasing values are either added or subtracted to a preceding threshold value (from which the peak threshold level 148 is derived) dependent upon whether the hit signal 228 or the miss signal 230 is asserted.

Data Threshold Level Algorithm

As described above with reference to both, and as can be seen in FIG. 23, the data threshold level 146 may, in one exemplary mode of operation of the receiver 50b, be located approximately mid-way between the peak threshold level 148 and the noise threshold level 144.

It is advantageous to locate the data threshold level 146 midway between the threshold levels 144 and 148 as pulses of the envelope signal 142 typically exhibited the greatest slope at 50 percent of the peak threshold level 148. Locating the data threshold level 146 at a level at which the envelope signal 142 exhibits the greatest slope results in the transcendence of the data threshold level 146 by the envelope signal 142 being less susceptible to time-jitter that may be introduced by a given amount of amplitude noise. Nonetheless, it is also desirable that traversal of the data threshold level 146 by noise signal is be reduced, and the data threshold level 146 should accordingly be raised when noise is detected on the carrier medium. Averaging the noise and peak threshold levels 144 and 148 provides a useful way to locate the data threshold level 146 in a voltage range where the envelope signal 142 may exhibited a steep slope, while also factoring in noise signal amplitude considerations.

In one embodiment, the calculation of the data threshold level 146 is performed by the averaging logic 218, illustrated in FIG. 16, that receives the seven-bit output sequences of both the noise follower 194 and the peak search logic 214, performs an averaging operation utilizing these seven-bit output sequences, and generates a unique seven-bit output sequence to the digital-to-analog converter 220. The converter 220 in turn outputs an analog signal, derived from the seven-bit output sequence of the averaging logic 218, that constitutes the data threshold level 146.

Figure 26:
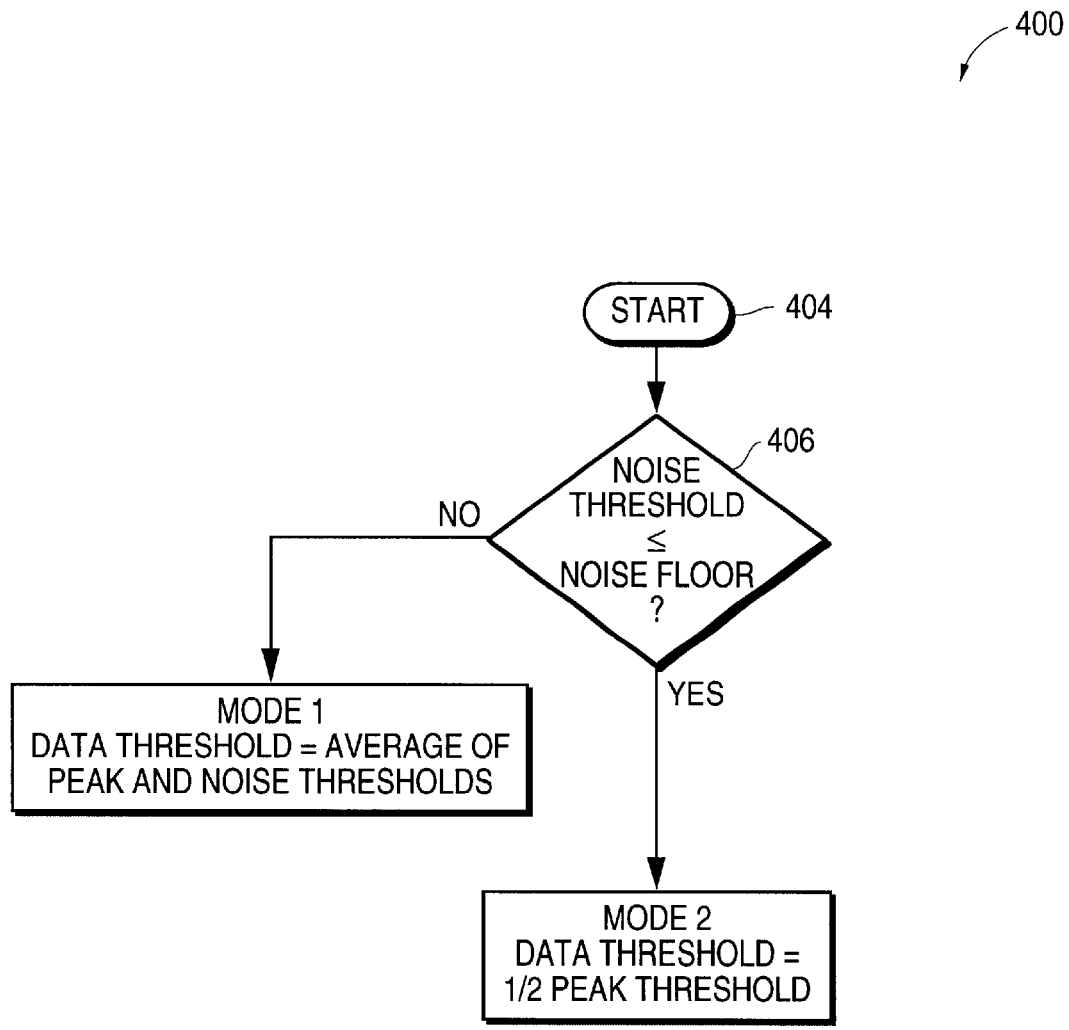
FIG. 26 is a flowchart illustrating a method, according to an exemplary embodiment, by which a mode of operation for the calculation of a data threshold level is determined.

FIG. 26 is a flowchart illustrating a method 400, according to an exemplary embodiment of the present invention, by which a mode of operation for the calculation of the data threshold level 146 is determined. The method 400 is performed by the averaging logic 218. Specifically, dependent upon the seven-bit output sequence of the noise follower 194 (that is representative of the noise threshold level 146), the averaging logic 218 may operate in a first mode wherein the data threshold level 146 is calculated to be the average of the peak and noise threshold levels 148 and 144, or in a second mode wherein the data threshold level 146 is calculated to be half of the peak threshold level 148. Referring now to the flowchart in FIG. 26, the method 400 commences at step 404, whereafter a determination is made at decision box 406 by the averaging logic 218 as to whether the noise threshold level 146, as represented by the seven-bit output sequence of the noise follower 194, is less than, or equal to, a predetermined minimum floor value. If the noise threshold level 146 is less than, or equal to, the predetermined minimum floor value (e.g., less than 50 m V), the averaging logic 218 then enters the second mode of operation, wherein the data threshold level 146 is calculated to simply be half of the peak threshold level 148. Alternatively, the averaging logic 218 enters the first mode of operation, wherein the data threshold level 146 is calculated to the average of the peak threshold level 148 and the noise threshold level 144.

It is advantageous to calculate the data threshold level 146 as half of the peak threshold level 148 if the noise threshold level 146 is less than, or equal to, the predetermined minimum floor value. Specifically, for very small data signals, the noise floor may introduce an artificial offset if the data threshold level 146 is calculated to be the average of the peak and noise threshold levels 144 and 148. In this case, the data threshold level 146 may be located at a level at which the slope of the envelope signal 142 is not very steep, and accordingly time-jitter may become a consideration. Accordingly, in the event that there is a very little noise on the carrier medium, it is beneficial to locate the data threshold level 146 at 50 percent of the peak threshold level 148, and not to factor in the noise signal (using the noise threshold level 144). However, for larger signals, the average of the noise and peak threshold levels 146 and 148 may provide an improved result.

The Transmitter/Receiver Circuitry (TX/RX)

2nd Embodiment

It will be appreciated that in the multi-dwelling unit (MDU) networking environment 2010 shown in FIG. 1B, the spacing between nodes (e.g., line cards, adapters or NICs that implement the network) may be greater than 500 feet. Specifically, the distance between, for example, an adapter coupled to a computer 2024 and the access concentrator 2032 may range from 200 to 5,000 feet. In this environment, a pulse in the form of a multi-cycle waveform such as that illustrated in FIG. 11, may become distorted to the extent that the reliability of the network is adversely effected. Accordingly, the present invention proposes that, for a networking environment wherein the inter-node distance over POTS wiring may exceed 500 feet, a single-cycle waveform, or pulse doublet, 300 shown in FIG. 10 be utilized to constitute the delimiters (or "pulses") that embody the information contained in a frame 99, as describe above.

Figure 27:
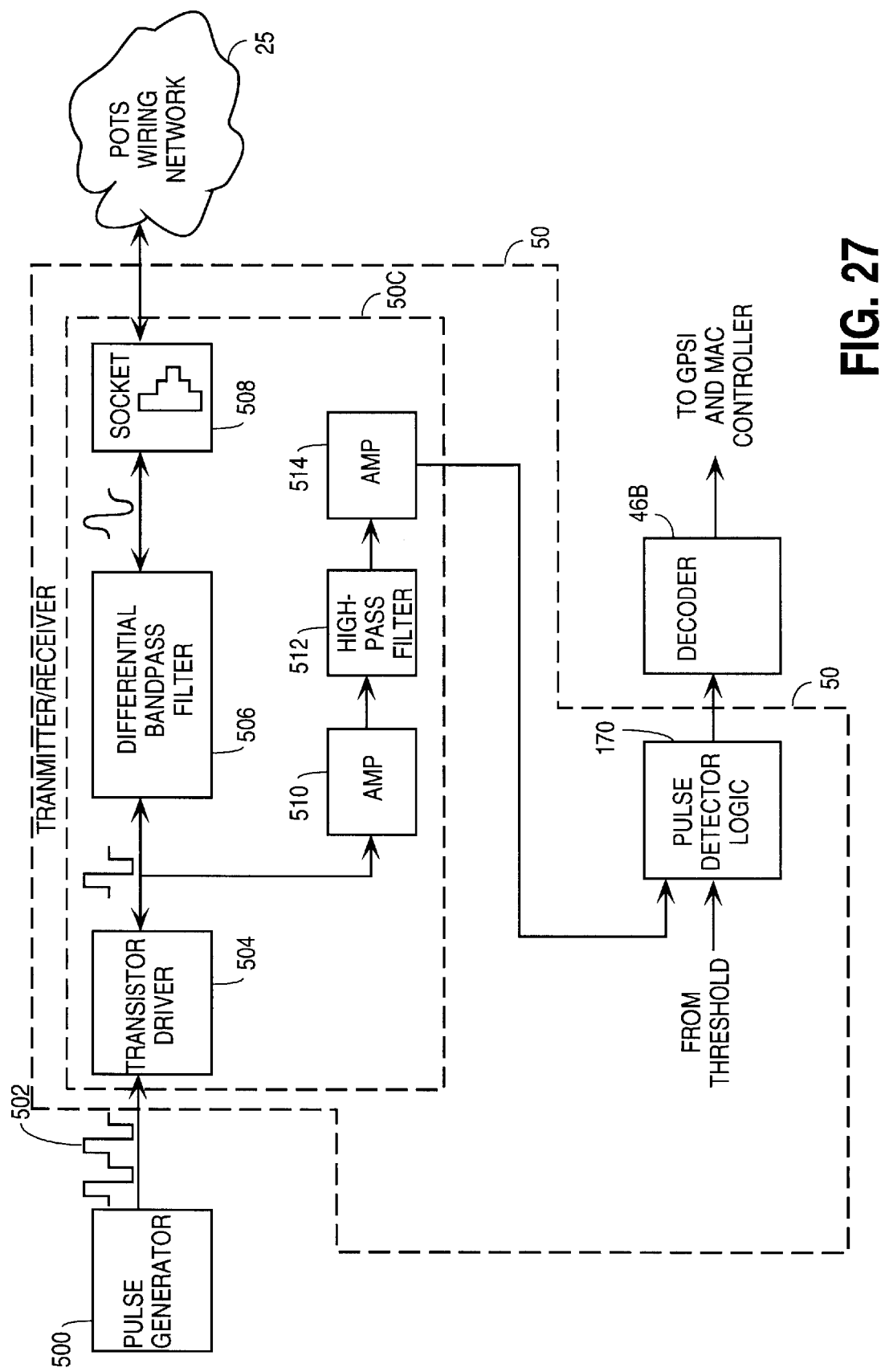
FIG. 27 is a block diagram illustrating component details for a second exemplary embodiment of transmitter/receiver (TX/RX) circuitry that may be included within a modem, adapter, line card or NIC.
Figure 28A:
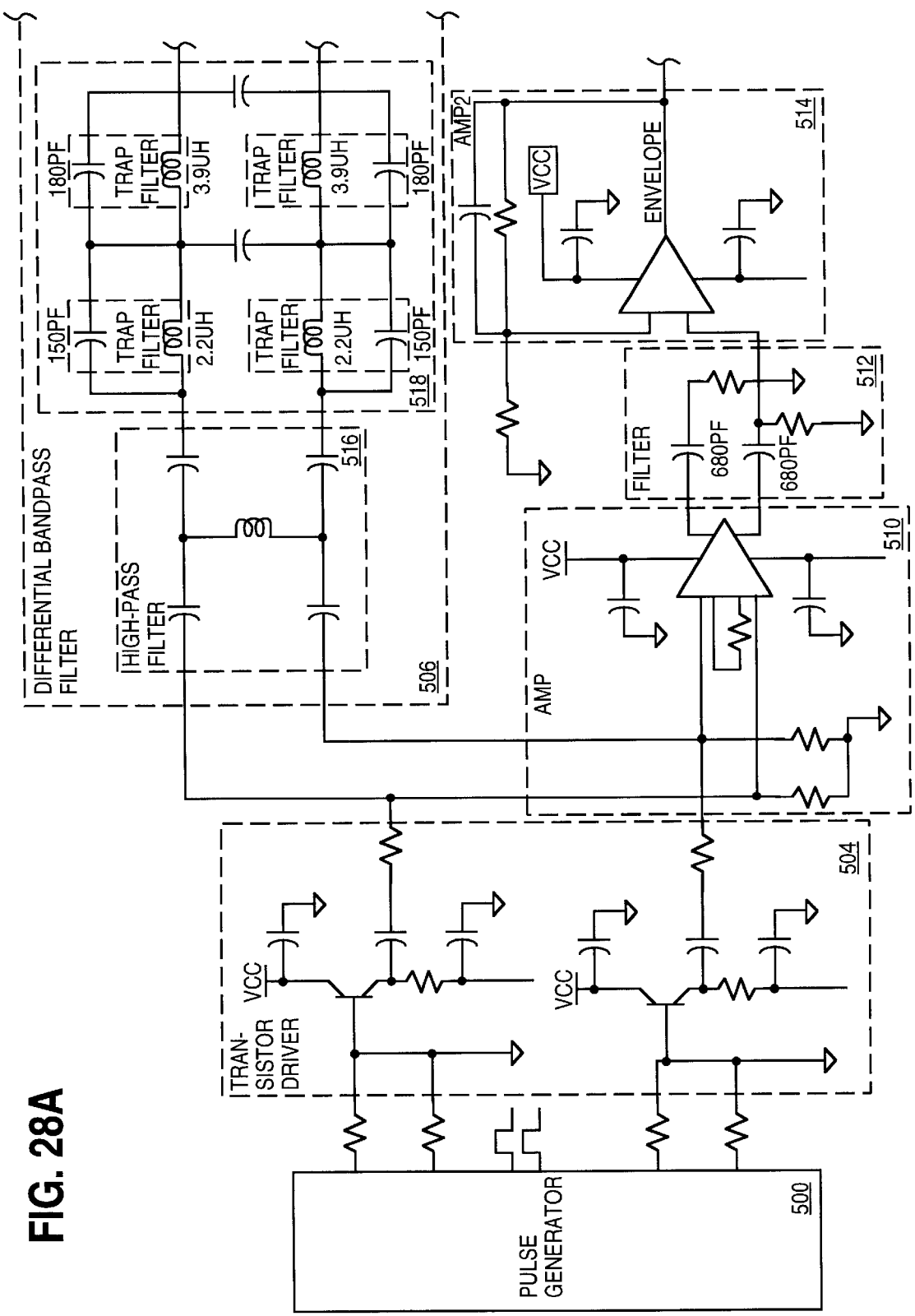
FIGS. 28A–28D provide a schematic illustration of components, according to one exemplary embodiment, that may be utilized to implement the transmitter/receiver circuitry (TX/RX) shown in FIG. 27.
Figure 28B:
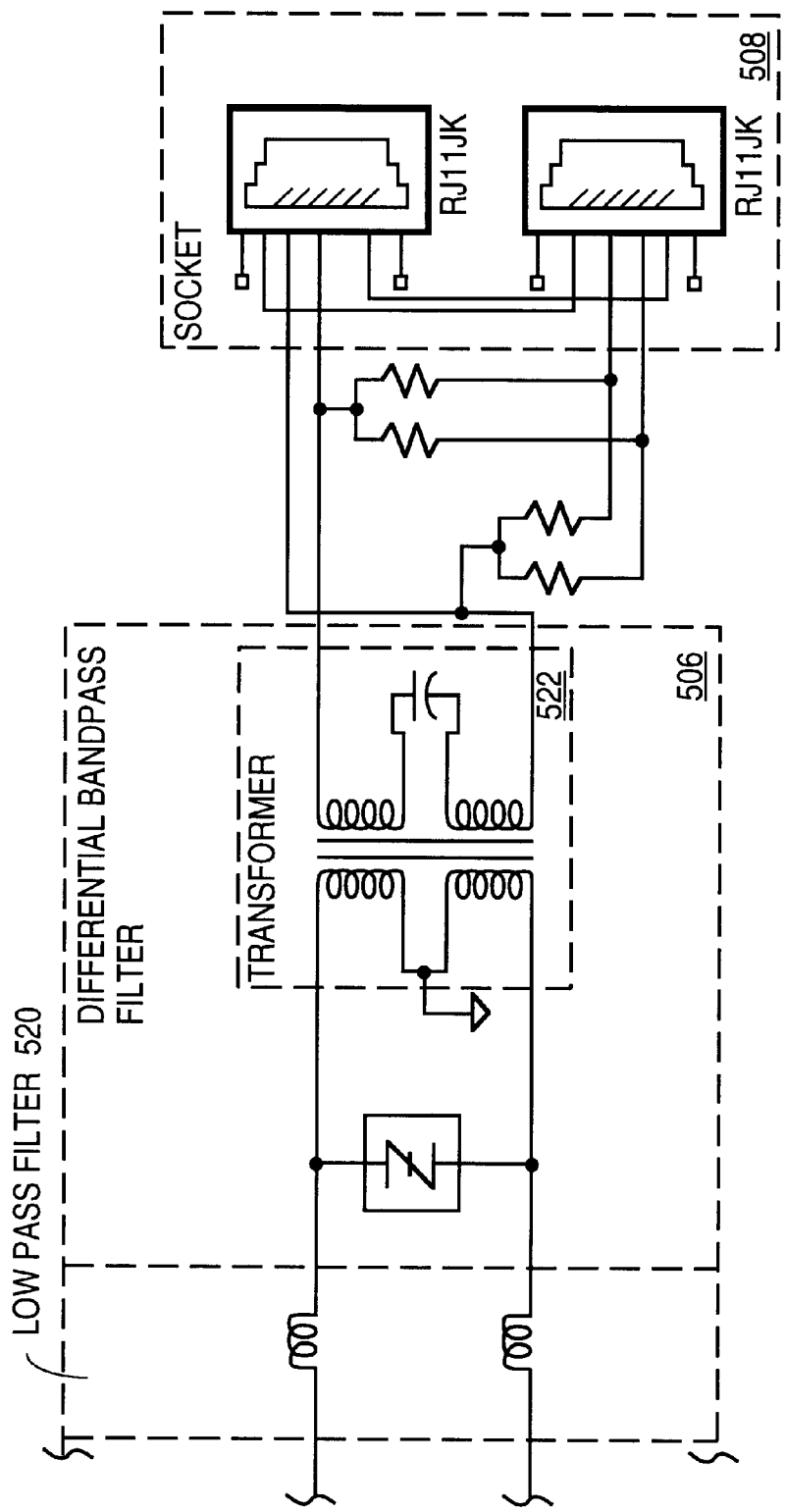
Figure 28C:
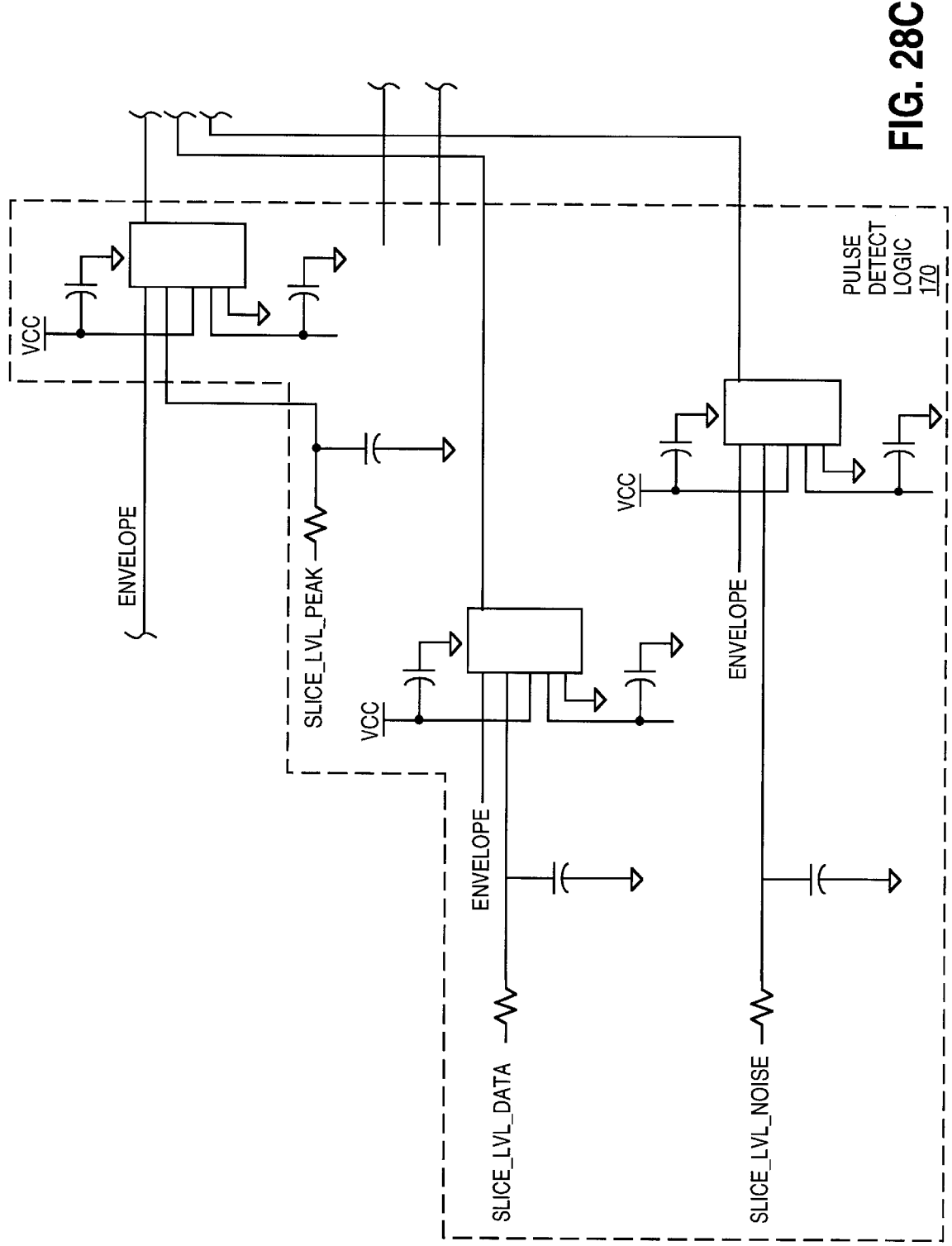
Figure 28D:
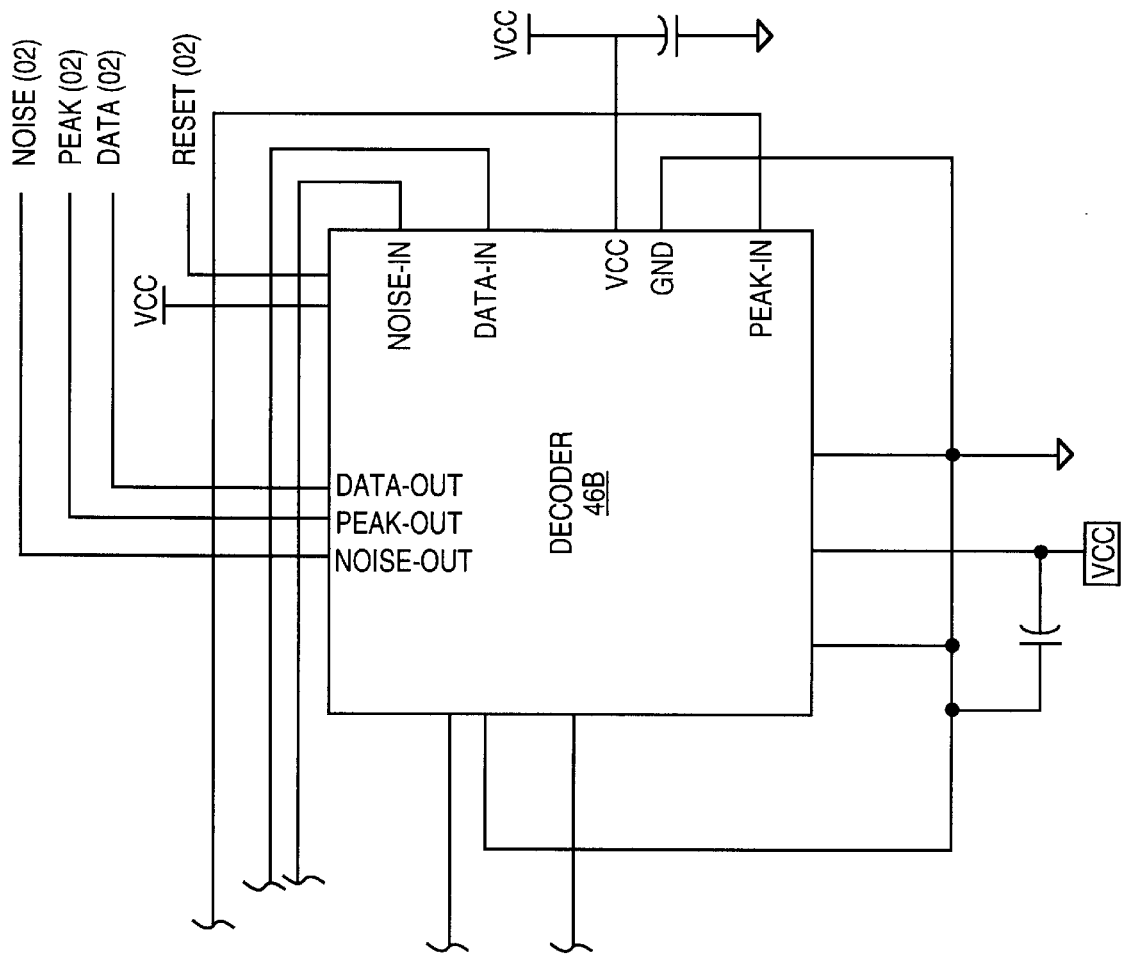

FIG. 27 illustrates a further exemplary embodiment of the TX/RX circuitry 50 utilizes single-cycle waveforms (or pulse doublets) 300 as delimiters. The TX/RX circuitry 50 may be included within network devices of, for example, the LongRun™ product range developed and sold by Tut Systems, Incorporated.

The embodiment of the TX/RX 50 circuitry shown in FIG. 27 differs from that shown in FIG. 15 primarily in that the Analog Front End (AFE) 50c does not include an envelope detector, and incorporates a number of filters to perform specific pulse-shaping functions. The AFE 50c implements both transmitter and receiver paths. Dealing first with the transmitter path, a pulse generator 500, which may constitute part of an encoder 46a implemented on an ASIC, generates bipolar square wave pulses 502 to a transistor driver 504 included within the AFE 50c. In one exemplary embodiment, the pulses 502 may be constituted by two unipolar pulse signals that together provide a differential signal that constitutes the single-cycle, bipolar square wave 502. From the transistor driver 504, a transmit signal is then propagated to a differential bandpass filter 506, that performs a number of high-pass, low-pass and frequency shaping functions with respect to the received signal, whereafter the transmit signal is propagated to a socket 508 for communication over the POTS wiring network 25.

Dealing now with the receive path implemented by the TX/RX circuitry 50, a signal received from the POTS wiring network 25 is communicated via the socket 508 through the differential bandpass filter 506, and is then communicated to an amplifier 510, a high-pass filter 512, a further amplifier 514, and then to the pulse detector logic 170 and decoder 46b. The pulse detector logic 170 operates in the manner described above, but the filtered and shaped signal is received directly from the POTS wiring network 25. It will thus be appreciated that the differential bandpass filter 506 operates as both a "transmit" and "receive" filter arrangement.

FIGS. 28A–28D provide a schematic diagram illustrating further details regarding the TX/RX circuitry 50, shown in block diagram form in FIG. 27.

The pulse generator 500 provides a pair of unipolar pulse inputs to first and second transistor arrangements within the transistor driver 504 to provide, in a differential view, a single-cycle, bipolar square-wave pulse. The first and second inputs to each of the transistor arrangements of the transistor driver 504 allow low-power and high-power pulses to be inputted to the TX/RX circuitry 50.

The transistor driver 504 provides differential inputs to the differential bandpass filter 506 that is constituted by a high-pass filter 516, a trap filter arrangement 518, a low-pass filter 520 and a transformer 522.

The trap filter arrangement 518 is shown to be coupled between the high-pass filter 516 and the low-pass filter 520 and includes, for each of the differential components of the signal, a pair of capacitors, each of which is coupled in parallel with a corresponding inductor. In the exemplary embodiment, for each of the differential components of the signal, a 150 picofarad capacitor is coupled in parallel with a 2.2 microhenry inductor, and a 180 picofarad capacitor is coupled in parallel with a 3.9 microhenry inductor. The parallel LC arrangements are then coupled in series.

FIG. 29 is a plot 524 showing exemplary transfer functions of the differential bandpass filter 506 both without, and inclusive of, the capacitors that constitute the trap filter arrangement 518. Specifically, the transfer function of the filter 506, minus the trap filter arrangement 518, is shown at 526, while the transfer function of the filter 506 inclusive of the trap filter arrangement 518 is illustrated at 528. As is apparent from the transfer function 524, the high-pass filter 516 and low-pass filter 520 operate to attenuate the frequency response of the output of the differential bandpass filter 506 around a 3.5 MHz center frequency. It will be noted that the rolloff, or drop rate, of the transfer function 526, as unmodified by the trap filter arrangement 518, is relatively gradual and constant. On the other hand, the rolloff, or drop rate, of the transfer function 528, as modified by the inclusion of the trap filter arrangement 518, is initially steep relative to the rolloff rate of the transfer function 526. This steeper initial rolloff in the transfer function 528 (and frequency response) of the output of the differential bandpass filter 506 is advantageous in that it reduces "bleeding" of a particular pulse output of the filter 506 into a subsequent pulse, and accordingly results in a reduction in the intersymbol interference described above.

The trap filter arrangement 518 operates to introduce a filter zeros, or nulls, in the frequency response of the differential bandpass filter 506 and an accompanying increased rolloff in the transfer function of the filter 506, in the 3.5 MHz frequency range. Preferably, the trap filter arrangement 518 operationally introduces a at least one filter zero at, or approximate, a resonant frequency of the high-pass filter 516 and thus reduces "ringing" in the frequency response of the filter 516 at this resonant frequency of the high-pass filter 516. In the exemplary embodiment, the high-pass filter 516 has a resonant frequency of approximately 3.5 MHz, and within the range of 2 MHz to 4 MHz.

In one exemplary embodiment, each capacitor/inductor (trap filter) combination of the trap filter arrangement 518 introduces a respective filter zero (also known as a null) at the resonant (or ringing) frequency of the high-pass filter so as to modify the transient function of the differential bandpass filter 506. Each trap filter combination introduces a respective zero in the transient function, thereby attenuating frequencies in its vicinity. (E.g., the 150 pf and 2.2 uH combination produces a first zero to the right of point 528 in FIG. 29, and the 180 pf and 3.9 uH combination produces the second zero immediately adjacent the first zero).

The bandpass filter 506 receives a bipolar square signal, and outputs a sinusoidal wave signal of limited bandwidth and limited transient response. The output signal is then propagated to the socket 508 for transmission of the POTS wiring network 25.

Turning now to the receiver path by the TX/RX circuitry 50, this path will now be described with reference to the schematic diagram provided in FIG. 28.

While the receiver path described above as implemented within the embodiment of the present invention shown in FIG. 15 is effective for facilitating the communication over a POTS wiring network at a frequency centered around 7.5 MHz, the use of a multi-cycle waveform, in one embodiment, may have has the consequence in that the detection of transcendence of a threshold (e.g., a data or peak threshold) is slowed by the signal processing operations that are required to possibly rectify the received multicycle waveform and to perform the envelope detection operation to generate the envelope signal 142. Further, the envelope signal 142 may exhibit a slow rise time, and accordingly make the detection of the transcendence of the data or peak threshold, as described above, vulnerable to noise. Indeed, the faster, or steeper, the rise time exhibited by a signal that is utilized to detect transcendence of a data threshold for the purposes of extracting data from a received signal, the less vulnerable to noise the detection mechanism is. Accordingly, the slope of the rise time of the signal utilized to detect a transcendence of a data or peak threshold 146 is determinate of the signal-to-noise ratio exhibited by a decode mechanism.

Further, a POTS wiring network 25 may exhibit reflections resulting from unterminated nodes and background noise from external sources. For this reason, it is desirable to utilize the first rising edge of a signal encountered for the purposes of detecting transcendence of a threshold for the purposes of extracting data from a received signal. Specifically, as rising edges subsequent to the first rising edge may include noise components resulting from reflections, it is desirable to use the.first rising edge for this purpose as this rising edge is least likely to be effected by reflections. It will be appreciated that the likelihood of encountering reflections increases with time subsequent to the propagation of the original signal on the POTS network.

Turning to the schematic diagram shown in FIGS. 28A–28D, a signal, or pulse, received via the POTS wiring network 25 is communicated via the socket 508, and through the differential bandpass filter 506 to the differential amplifier 510 and through the high-pass filter 512, an operational amplifier (op amp) 514, from where the amplified and filtered signal is communicated to the pulse detector logic 170. The high-pass filter 512 includes a pair of 680 picofarad capacitors, one of which is coupled to receive the output of the differential amplifier 510. The output of the high-pass filter 512 provides input to the operational amplifier 514.

Figure 30:
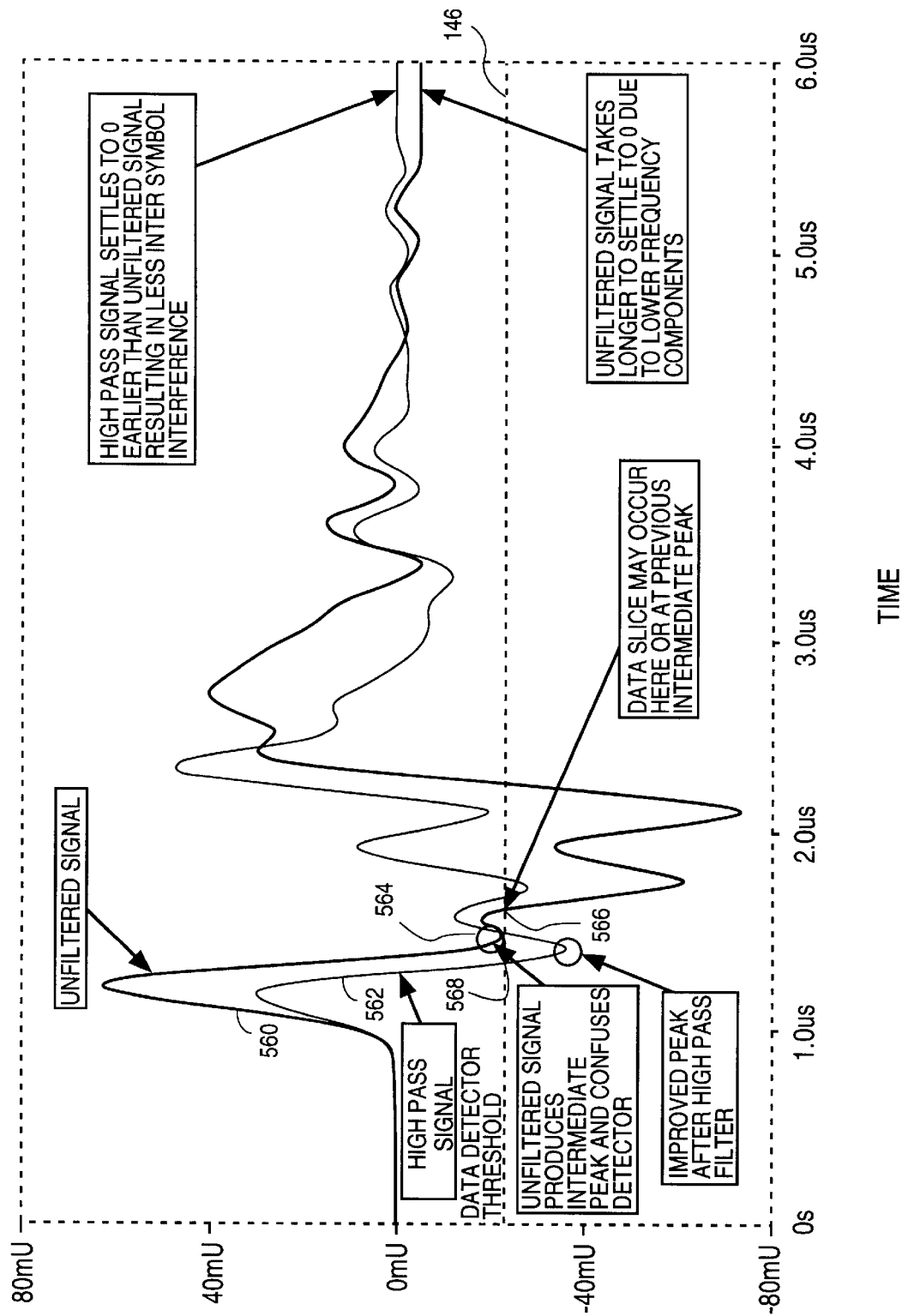
FIG. 30 illustrates exemplary filtered and unfiltered signals to illustrate the effect of one embodiment of a filter arrangement.

The polarity of the received signal is, it will be appreciated, determined by the manner in which the filter 506 is coupled to the POTS wiring network. For example, the Tip and Ring connections may be reversed, in which case the first "rising" edge of a signal propagated through the receiver path may in fact be a falling edge. FIG. 30 shows a first exemplary signal 560 that may be received via the socket 508 from the POTS wiring network 25 responsive to a transmission of a pulse doublet 300, such as that illustrated in FIG. 11, on the POTS wiring network 25 by a transmitting device. In this case, it will be noted that the Tip and Ring connection was such that the first major edge of the signal 560 is a rising edge. It will also be noted that the quality of the signal 560 degrades with time as a result of the presence of reflections of the original transmitted pulse on the POTS wiring network 25. An alternative signal (not shown), which may be received by the TX/RX circuitry 50 via the socket 508 from the POTS wiring network 25, may have an opposite polarity to the signal 560 as a result of the reversal of the Tip and Ring connection to the POTS wiring network 25. The first major edge.of such a signal is a falling edge Referring now to the peak threshold level algorithm described above with reference to FIGS. 23 and 24, it will be recalled that the peak hit logic 212 is described as including a timer to track a time interval following the detection of assertion of a noise trigger signal 222. The timer is utilized to measure a predetermined time interval within which a peak trigger signal 224 is asserted, responsive to which a hit signal 228 is asserted to raise a peak threshold level 148. Accordingly, a detection of a traversal of the noise threshold 144 opens a "window" within which a traversal of the peak threshold 148 should occur in order to cause the peak detection threshold 148 to be raised.

The utilization of the signal 552 for the purposes of detecting data threshold 146 or peak threshold 148 transcendence may be challenging for the following reasons. First, for the embodiment where the delimiter comprises a pulse doublet 300, it is envisaged that the "window" within which a peak threshold 148 transcendence must be detected would be in the range of 200 ns, as opposed to 1 ms for an embodiment within in which a multi-cycle waveform comprises a delimiter. It is possible to achieve this narrowed window in view of the fact that the signal on which the peak threshold 148, data threshold 146 and noise threshold 144 are set is a filtered signal that has not undergone envelope detection. Envelope detection may be required with the multi-cycle waveform embodiment.

The significance of an embodiment including the high-pass filter 512, coupled between the differential amplifier 510 and the operational amplifier 514 as described above, may best be understood with reference to FIG. 30. FIG. 30 shows an exemplary first signal 560 that may be received at the high-pass filter 512 from a POTS wiring network 25 (via the socket 508, the bandpass filter 506 and the amplifier 510) as a result of propagating a pulse doublet 300 over the network 25. Also shown is a high-pass signal 562 that may be outputted from high-pass filter 512, responsive to an input of the first signal 560. The first signal 560 exhibits a number of characteristics relative to the high-pass signal 562 that are undesirable for the purposes of detecting transcendence of a threshold, for example the data threshold 146. In one embodiment it is desirable that the received signal transcend the data threshold 146 within a narrow temporal window (e.g., within a range of 200 ns). As shown in FIG. 30, as a result of the lower frequency components of the unfiltered signal 560, an intermediate peak 564 is produced above the data threshold 146, before the unfiltered signal 560 eventually transcends the data threshold 146 at 566 (i.e., a "data slice" only occurs at 566).

However, as illustrated in FIG. 30, the absence of low frequency components within the high-pass signal 562 results in a transcendence of the data threshold 146 (i.e., a "data slice") occurring at 568 which is earlier, and thus more desirable, than a data slice at 566.

Accordingly, the absence of low frequency components within the high-pass signal 562 has the effect of removing intermediate peaks that would be present in the unfiltered signal 506. This creates a great degree of certainty that the data threshold 146 will be transcended within a narrow temporal window. Accordingly, the responsiveness of the threshold logic 172 and the pulse detector logic 170 may be positively effected.

Again referring to FIG. 30, it will be noted that the high-pass signal 560 settles in 0 V earlier than the unfiltered signal 560, this being advantageous in that it results in less intersymbol interference.

Figure 31:
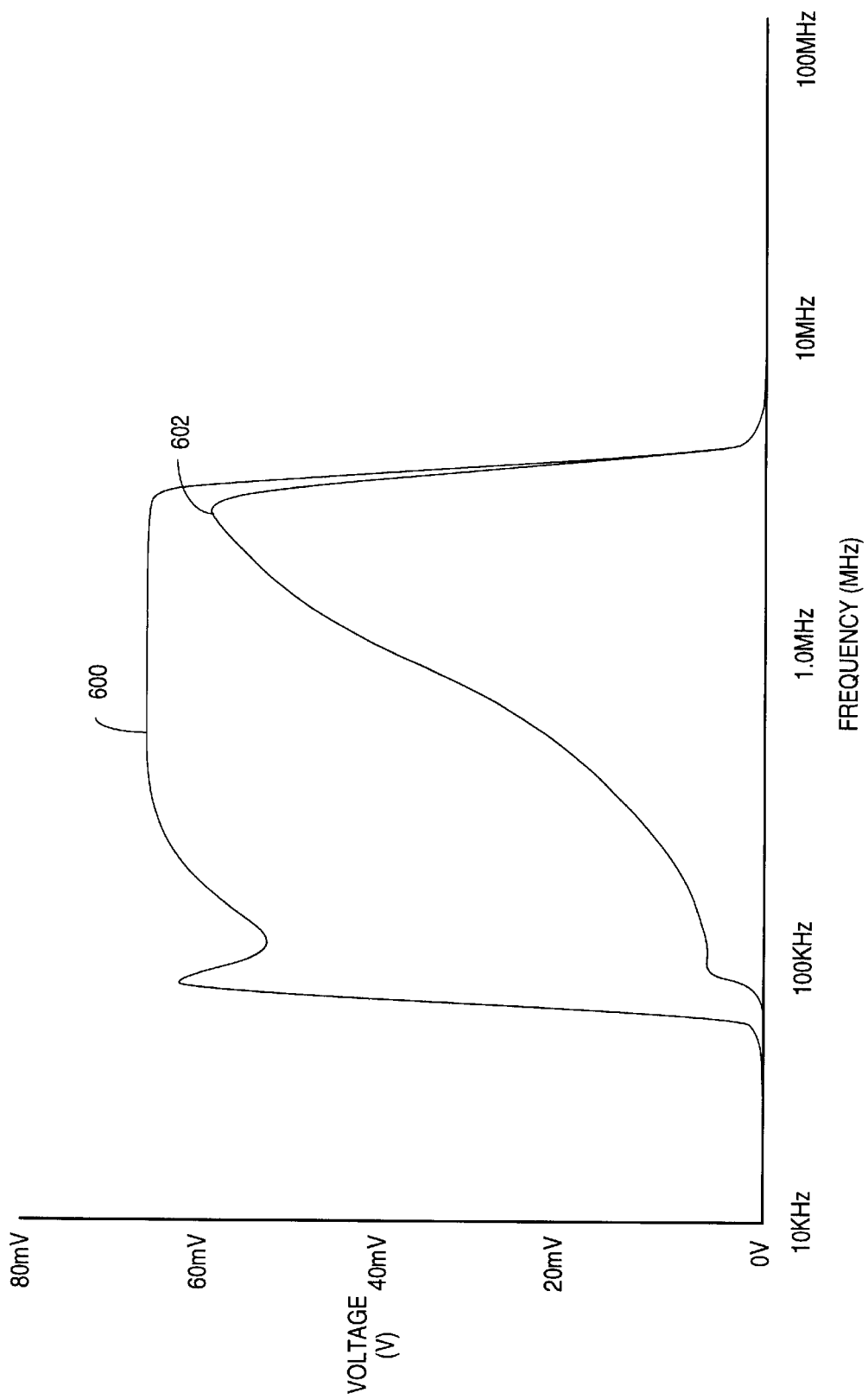
FIG. 31 is a plot showing a transfer function for both an input and an output signal of an exemplary high-pass filter arrangement.

FIG. 31 plots exemplary frequency responses 600 and 602 of the respective the first signal 560 and high-pass signal 562 outputted by the high-pass filter 512. It will be noted that the frequency response 602 of the output of the high-pass filter 512 has been substantially attenuated at the lower frequencies of the output signal in order to enhance the high-frequency components of the signal.

Thus, a filter arrangement for shaping a pulse transmission over POTS wiring, and a method of manufacturing the same, have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative, rather than a restrictive, sense.

What is claimed is:

1. A filter arrangement for shaping a signal propagated over POTS wiring, the filter arrangement comprising:
 a first coupling to receive the signal;
 a high-pass filter;
 a low-pass filter coupled to the high-pass filter;
 a plurality of trap filters coupled to both the high-pass and low-pass filters, wherein the plurality of trap filters operationally introduces a plurality of filter zeros at a resonant frequency of the high-pass filter; and
 a second coupling to couple the filter arrangement to the POTS wiring.

2. The filter arrangement of claim 1, wherein the plurality of trap filters is coupled between the high-pass and low-pass filters.

3. The filter arrangement of claim 1, wherein the plurality of trap filters introduces the plurality of filter zeros at a frequency of between 3 MHz and 4 MHz.

4. The filter arrangement of claim 1, wherein the plurality of trap filters introduces the plurality of filter zeros at a frequency of approximately 3.5 MHz.

5. The filter arrangement of claim 3, wherein the plurality of filter zeros introduced by the plurality of trap filters causes an increased drop-off rate in a frequency response of the filter arrangement between 3 MHz and 4 MHz.

6. The filter arrangement of claim 1, wherein the plurality of trap filters comprises a pair of capacitors coupled in series.

7. The filter arrangement of claim 6, wherein the capacitors have respective capacitances of approximately 150 and 180 picofarads.

8. The filter arrangement of claim 1, comprising a differential bandpass filter, wherein the plurality of trap filters comprises a first pair and second pair of capacitors coupled between respective first and second outputs of the high-pass filter and first and second inputs of the low-pass filter.

9. The filter arrangement of claim 1, including a transformer.

10. The filter arrangement of claim 1, wherein the second coupling is coupled to an RJ-11 socket to facilitate coupling of the filter arrangement the POTS wiring.

11. A method of constructing a filter arrangement for shaping a signal propagated over POTS wiring, the method comprising:
 coupling a low-pass filter to a high-pass filter; and
 coupling a plurality of trap filters to both the high-pass and low-pass filters, wherein the the plurality of trap filters operationally introduces a plurality of filter zeros at a resonant frequency of the high-pass filter.

12. The method of claim 11, further comprising coupling the plurality of trap filters between the high-pass and low-pass filters.

13. The method of claim 11, wherein the plurality of trap filters introduces the plurality of filter zeros at a frequency of between 3 MHz and 4 MHz.

14. The method of claim 13, wherein the plurality of trap filters introduces the plurality of filter zeros at a frequency of approximately 3.5 MHz.

15. The method of claim 13, wherein the plurality of filter zeros introduced by the plurality of trap filters causes an increased drop-off rate in a frequency response of the filter arrangement between 3 MHz and 4 MHz.

16. The method of claim 11, wherein the plurality of trap filters comprises a pair of capacitors coupled in series.

17. The method of claim 16, wherein capacitors of the pair of capacitors have respective capacitances of 150 and 180 picofarads.

18. The method of claim 11, wherein the filter arrangement constitutes a differential bandpass filter, the method including coupling first and second pairs of capacitors between respective first and second outputs of the high-pass filter and first and second inputs of the low-pass filter.

19. A method of shaping a signal for transmission over POTS wiring, the method comprising:

receiving an input signal via an input;

propagating the input signal through a high-pass filter, a low-pass filter, and a plurality of trap filters to generate an output signal, wherein the plurality of trap filters introduces a plurality of filter zeros into the output signal at approximately a resonant frequency of the high-pass filter; and propagating the output signal over the POTS wiring.

20. A network device facilitating communication over a network, the network device comprising:

a first coupling arrangement to couple the network device to a POTS wiring network;

a filter arrangement for shaping a signal propagated over the POTS wiring network, the filter including a high-pass filter, a low-pass filter coupled to the high-pass filter and a plurality of trap filters coupled to both the high-pass and low-pass filters, wherein the plurality of trap filters operationally introduces a plurality of filter zeros at a resonant frequency of the high-pass filter.

21. The network device of claim 20, wherein the network device is selected from a group consisting of a Network Interface Card, a line card or an adapter.

22. A method of shaping a signal received over POTS wiring, the method comprising:

receiving an input signal via an input from the POTS wiring;

propagating the input signal through a high-pass filter, a low-pass filter, and a plurality of trap filters to generate an output signal, wherein the plurality of trap filters introduces a plurality of filter zeros into the output signal at approximately a resonant frequency of the high-pass filter; and propagating the output signal to signal processing logic.

* * * * *